US010757349B2

(12) United States Patent
Kajimura et al.

(10) Patent No.: US 10,757,349 B2
(45) Date of Patent: Aug. 25, 2020

(54) IMAGING DEVICE AND REPRODUCING DEVICE

(71) Applicant: CANON KABUSHIKI KAISHA, Tokyo (JP)

(72) Inventors: Fumihiro Kajimura, Kawasaki (JP); Yasuo Suda, Yokohama (JP); Koichi Washisu, Tokyo (JP); Akihiko Nagano, Ichihara (JP); Ryo Yamasaki, Tokyo (JP); Masafumi Kimura, Kawasaki (JP); Makoto Oikawa, Yokohama (JP); Go Naito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/184,721

(22) Filed: Nov. 8, 2018

(65) Prior Publication Data
US 2019/0082127 A1 Mar. 14, 2019

Related U.S. Application Data

(63) Continuation of application No. 15/435,483, filed on Feb. 17, 2017, now Pat. No. 10,182,199.

(30) Foreign Application Priority Data

Feb. 22, 2016 (JP) ................................ 2016-031073
Jan. 5, 2017 (JP) ................................ 2017-000524

(51) Int. Cl.
*H04N 5/357* (2011.01)
*H04N 5/232* (2006.01)
(Continued)

(52) U.S. Cl.
CPC ........... *H04N 5/357* (2013.01); *H04N 5/2355* (2013.01); *H04N 5/23232* (2013.01);
(Continued)

(58) Field of Classification Search
CPC ............... H04N 5/357; H04N 5/23232; H04N 5/23245; H04N 5/2355; H04N 5/35554;
(Continued)

(56) References Cited

U.S. PATENT DOCUMENTS 8,508,640 B2* 8/2013 Naruse .............. H01L 27/14621
348/294
8,642,938 B2* 2/2014 Bikumandla ........... G01S 17/89
250/208.1
(Continued)

FOREIGN PATENT DOCUMENTS

JP 2013-172210 A 9/2013
JP 2014-048459 A 3/2014

*Primary Examiner* — Pritham D Prabhakher
(74) *Attorney, Agent, or Firm* — Cowan, Liebowitz & Latman, P.C.

(57) ABSTRACT

According to the present invention, an imaging device and a reproducing device that allow for high quality reproduction of images generated by using two image signals having different lengths of accumulation periods output form a single imaging element are provided. A solid state imaging device of the invention includes a pixel array including a pixel having first and second photoelectric conversion units; a scanning unit that drives the pixel such that an accumulation period of an intermediate time of the first photoelectric conversion unit matches an intermediate time of an accumulation period of the second photoelectric conversion unit; a readout unit that reads out a first image signal from the first photoelectric conversion unit and reads out a second image signal from the second photoelectric conversion unit; and a generating unit that generates images by using the first and second image signals whose accumulation periods have the matched intermediate time.

14 Claims, 31 Drawing Sheets

(51) Int. Cl.
  *H04N 5/378* (2011.01)
  *H04N 5/235* (2006.01)
  *H04N 5/355* (2011.01)
  *H04N 5/3745* (2011.01)
  *H04N 5/77* (2006.01)

(52) U.S. Cl.
  CPC ..... *H04N 5/23245* (2013.01); *H04N 5/35554* (2013.01); *H04N 5/35563* (2013.01); *H04N 5/378* (2013.01); *H04N 5/3745* (2013.01); *H04N 5/772* (2013.01)

(58) Field of Classification Search
  CPC ...... H04N 5/3745; H04N 5/378; H04N 5/772; H04N 5/35563
  USPC ........................................................ 348/300
  See application file for complete search history.

(56) References Cited

U.S. PATENT DOCUMENTS

| | | | |
|---|---|---|---|
| 8,913,167 B2 | 12/2014 | Yamashita et al. | |
| 9,029,749 B2* | 5/2015 | Unagami | H01L 27/148 250/208.1 |
| 9,420,208 B2 | 8/2016 | Tashiro et al. | |
| 9,621,860 B2 | 4/2017 | Saito | |
| 9,667,894 B2* | 5/2017 | Mabuchi | H01L 27/14612 |
| 9,794,497 B2* | 10/2017 | Minowa | H01L 27/14609 |
| 2005/0092894 A1* | 5/2005 | Fossum | H01L 27/14609 250/208.1 |
| 2008/0079044 A1* | 4/2008 | Wada | H04N 5/335 257/292 |
| 2008/0266434 A1* | 10/2008 | Sugawa | H04N 5/35554 348/308 |
| 2009/0086071 A1* | 4/2009 | Kagawa | H04N 5/355 348/300 |
| 2010/0134648 A1* | 6/2010 | Funatsu | H04N 5/37457 348/222.1 |
| 2011/0007196 A1 | 1/2011 | Yamashita et al. | |
| 2011/0121162 A1 | 5/2011 | Murata et al. | |
| 2011/0141333 A1* | 6/2011 | Naruse | H01L 27/14621 348/308 |
| 2013/0181119 A1* | 7/2013 | Bikumandla | G01S 7/4863 250/214.1 |
| 2013/0206964 A1 | 8/2013 | Yamashita et al. | |
| 2013/0214129 A1 | 8/2013 | Kobayashi et al. | |
| 2013/0215305 A1 | 8/2013 | Yamashita et al. | |
| 2014/0016006 A1 | 1/2014 | Tashiro et al. | |
| 2015/0076323 A1* | 3/2015 | Mabuchi | H04N 5/37452 250/208.1 |
| 2015/0281618 A1 | 10/2015 | Saito | |
| 2016/0037101 A1* | 2/2016 | Shim | H04N 5/357 348/241 |
| 2016/0173797 A1* | 6/2016 | Minowa | H04N 5/37452 348/297 |

\* cited by examiner

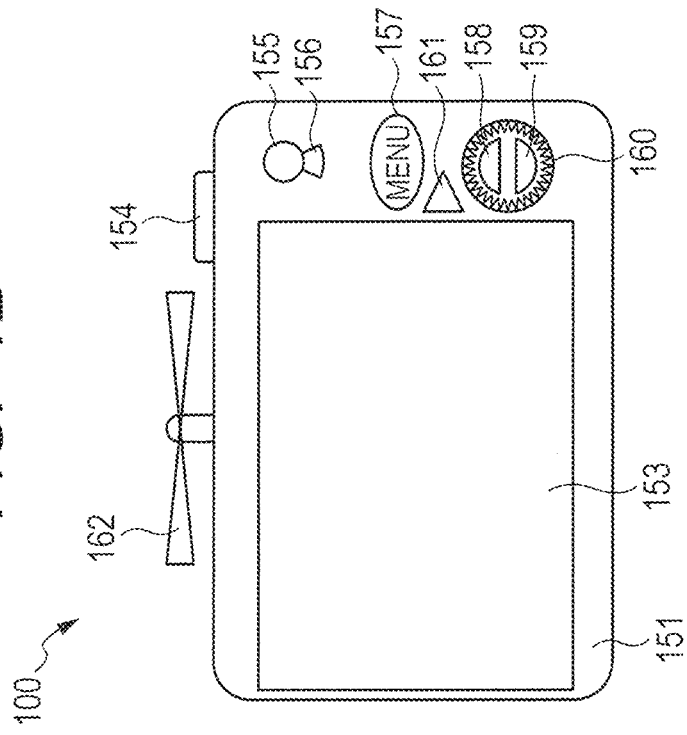
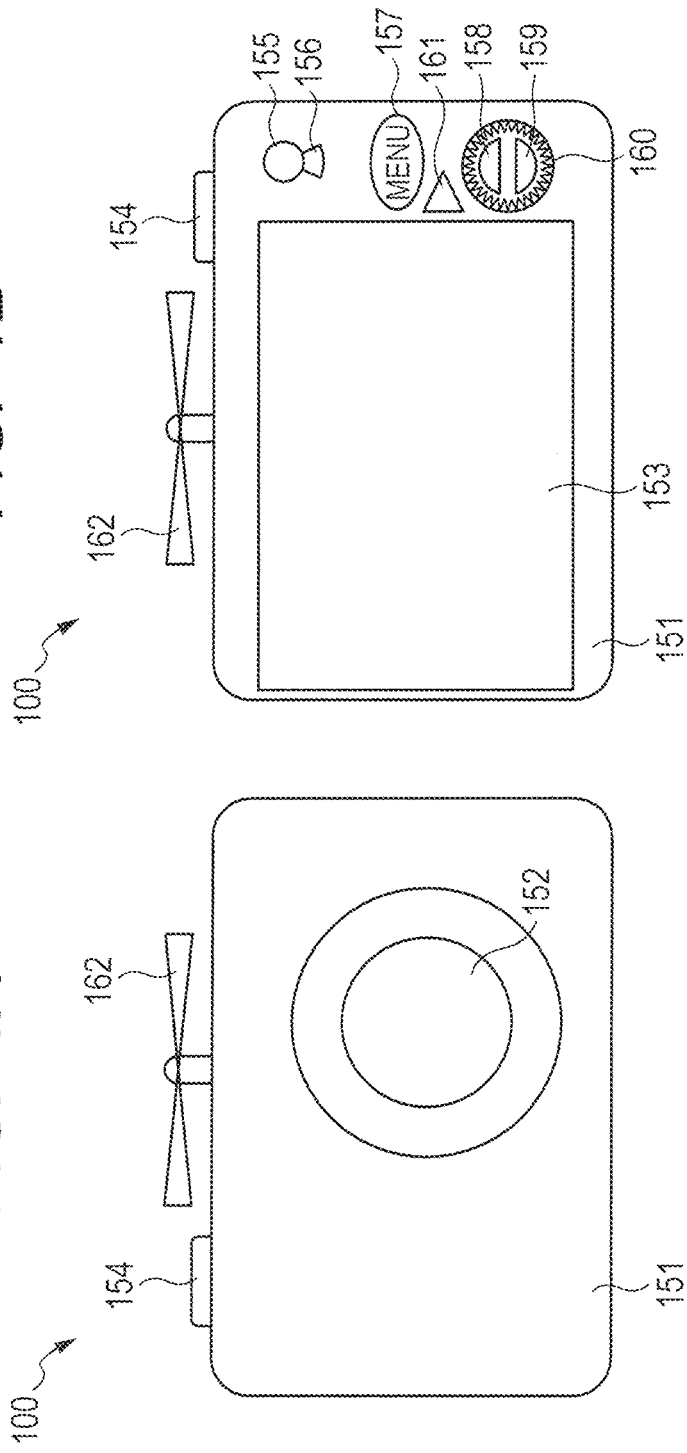

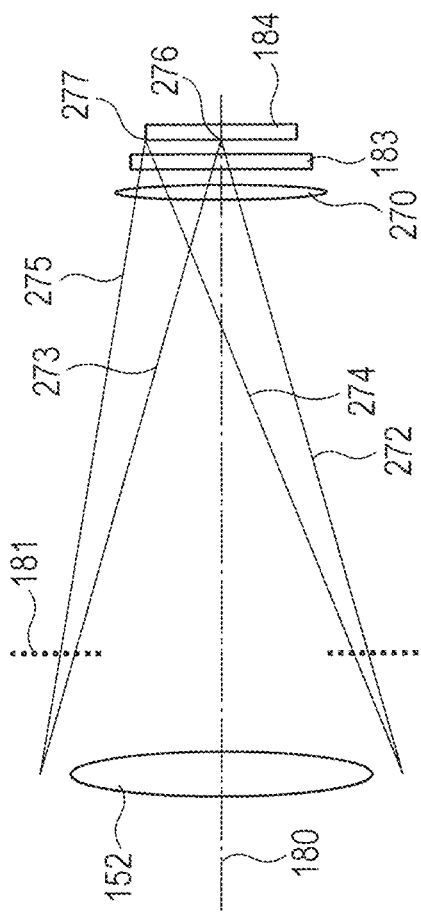
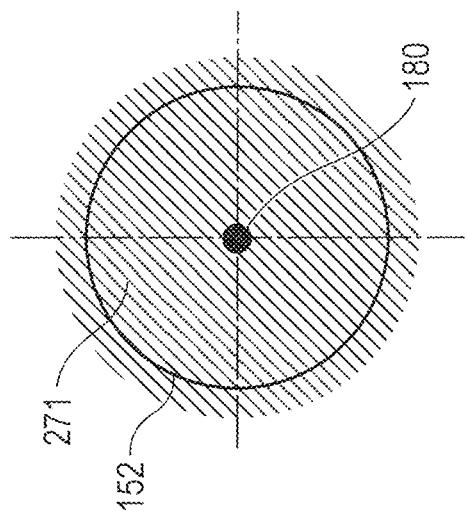

| BOX TYPE | | | | SIZE (BYTES) | DEFINITION | |
|---|---|---|---|---|---|---|
| skip | | | | | FREE SPACE | ~505 |
| | udta | | | | USER DATA | ~506 |
| | | p2dt | | | METADATA | ~507 |
| | | | clpn | 6 | CLIP NAME | ~508 |
| | | | umid | 64 | CLIP UMID | ~509 |
| | | | sttc | 8 | TIMECODE TOP VALUE | ~510 |
| | | | p2sn | 20 | STORAGE MEDIA SERIAL NUMBER | ~511 |

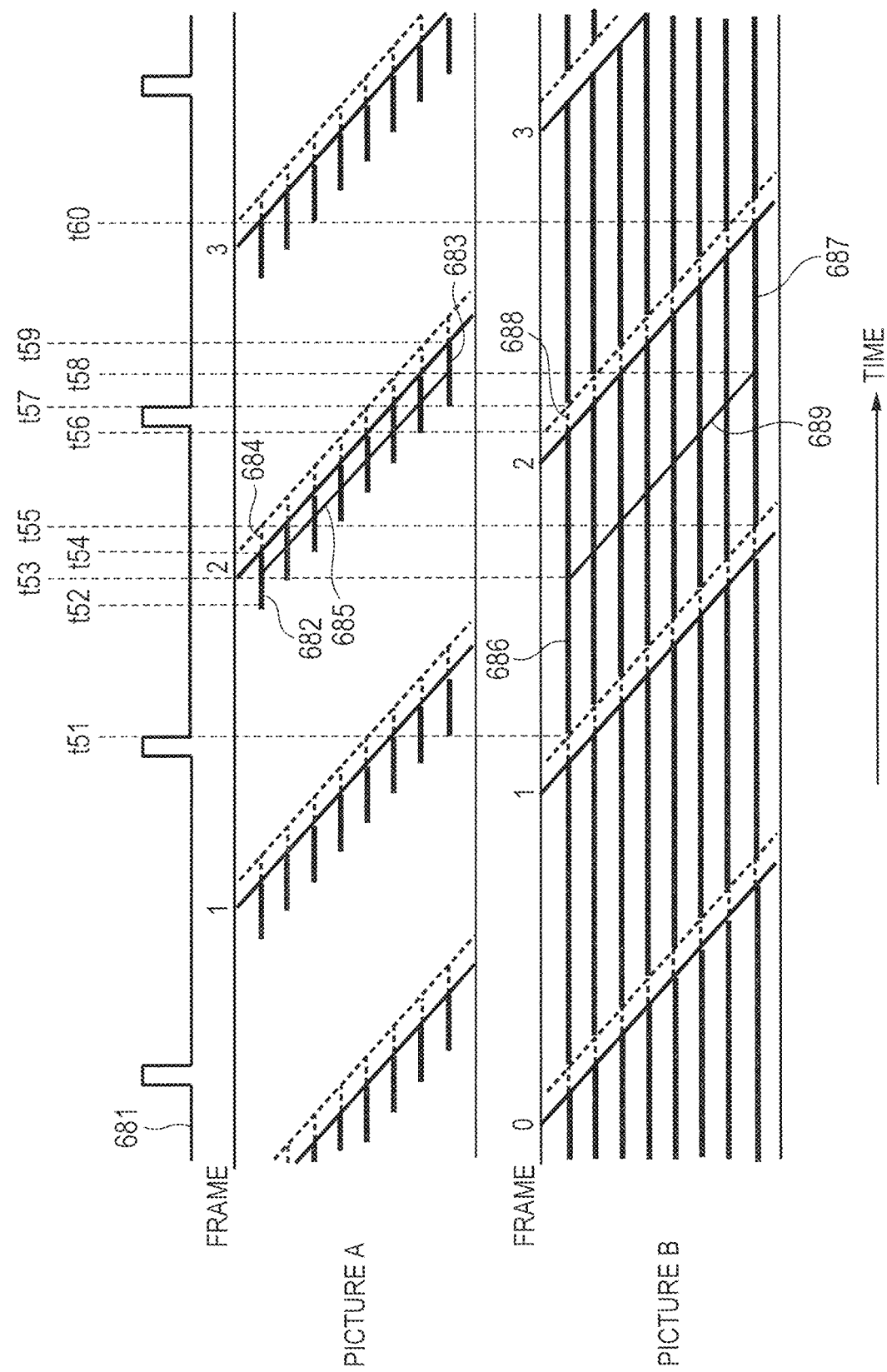

PICTURE B

PICTURE B

PICTURE A

PICTURE B

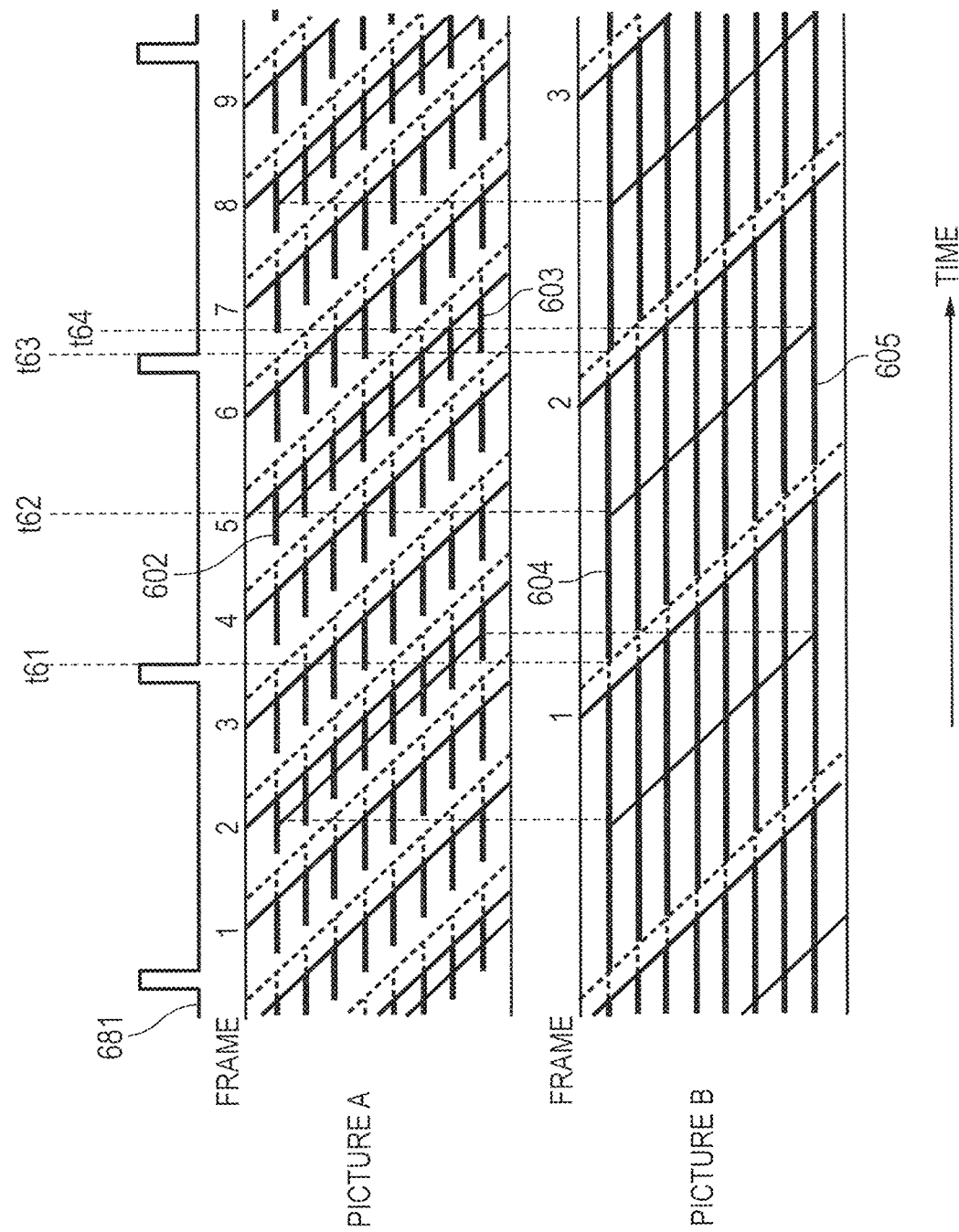

IMAGING DEVICE AND REPRODUCING DEVICE

CROSS-REFERENCE TO RELATED APPLICATIONS

This application is a continuation of application Ser. No. 15/435,483, filed Feb. 17, 2017 the entire disclosure of which is hereby incorporated by reference.

BACKGROUND OF THE INVENTION

Field of the Invention

The present invention relates to an imaging device and a reproducing device for an image that is based on two image signals having different lengths of accumulation periods output from a single imaging element.

Description of the Related Art

By simultaneously capturing a motion image and a static image by using a single camera, it is possible to enjoy a critical scene in a motion image as a static image while viewing a captured scene as a motion image. Further, by simultaneously capturing a normal framerate motion image and a high framerate motion image by using a signal camera, a particular scene of a normal framerate motion image to a slow-motion video of a high framerate motion image can be switched to enjoy it as a high quality production. As such, a use of an imaging device having two photoelectric conversion units of different light receiving efficiencies can provide an image that allows a viewer to perceive full of movement, which can significantly enhance a value of a captured image.

Japanese Patent Application Laid-open No. 2014-048459 proposes an imaging device that reads out a first image signal and a second image signal from two photoelectric conversion units having different light receiving efficiencies. Such a configuration allows for simultaneously capturing a motion image and a static image through a single capturing lens and simultaneously capturing a normal framerate motion image and a high framerate motion image.

In the technique of Japanese Patent Application Laid-open No. 2014-048459, however, the use of two image signals having different lengths of accumulation periods output from a single imaging element causes the following problems.

In the imaging device disclosed in Japanese Patent Application Laid-open No. 2014-048459, a capturing is performed such that the first image signal and the second image signal have the matched ending time of an accumulation period. In this case, the intermediate time between the starting time and the ending time of an accumulation period is different between the first image signal and the second image signal, which means that a timing of capturing an object may be different between both signals. In particular, when an object is moving, the position of an object on an image may be different between the first image signal and the second image signal.

Thus, when trying to use one of the first image signal and the second image signal to correct the other, this results in a problem of being unable to perform proper correction because of the different positions of an object on an image. Further, when a part of frame images of a video generated by using one of the first image signal and the second image signal is replaced with frame images generated by using the other, this results in a problem of an unnatural motion of an object during video reproduction as if there were missing frames.

SUMMARY OF THE INVENTION

An imaging device according to the present invention has: a pixel array including a pixel having a first photoelectric conversion unit and a second photoelectric conversion unit; a scanning unit that drives the pixel such that an intermediate time of an accumulation period of the first photoelectric conversion unit matches an intermediate time of an accumulation period of the second photoelectric conversion unit; a readout unit that reads out a first image signal from the first photoelectric conversion unit and reads out a second image signal from the second photoelectric conversion unit; and a generating unit that generates images by using the first image signal and the second image signal whose accumulation periods have the matched intermediate time.

Another imaging device according to the present invention has: a pixel array having a pixel including a third photoelectric conversion unit, a first charge holding unit, and a second charge holding unit, wherein the first and second charge holding units hold signal charges generated in the third photoelectric conversion unit; a readout unit that reads out a first image signal that is based on signal charges which are generated in the third photoelectric conversion unit during a first accumulation period and held in the first charge holding unit and a second image signal that is based on signal charges which are generated in the third photoelectric conversion unit during a plurality of second accumulation periods and held in the second charge holding unit; a scanning unit that drives the pixel such that an intermediate time of the first accumulation period matches an intermediate time of the plurality of second accumulation periods; and a generating unit that generates images by using the first image signal and the second image signal whose accumulation periods have the matched intermediate time.

Further, a reproducing device according to the present invention reproduces a video generated or recorded by the imaging device according to the present invention and comprises a reproducing unit that associates the first image and the second image with each other whose accumulation periods have the matched intermediate time, and performs reproduction.

Further features of the present invention will become apparent from the following description of exemplary embodiments with reference to the attached drawings.

BRIEF DESCRIPTION OF THE DRAWINGS

FIG. 1A and FIG. 1B are external views of an imaging device according to a first embodiment of the present invention.

FIG. 6A and FIG. 6B are diagrams illustrating an imaging optics and the imaging element in the imaging device according to the first embodiment of the present invention.

FIG. 20 is a diagram illustrating accumulation and transfer timings when a capturing is performed by the imaging device according to the first embodiment such that accumulation periods have a matched intermediate time.

FIG. 23 is a diagram illustrating an example use of a picture A and a picture B stored in a storage in a tablet terminal, a personal computer, a television monitor, or the like.

FIG. 27 is a diagram illustrating accumulation and transfer timings performed when the framerates of two image signals are different, according to an imaging device of a second embodiment.

DESCRIPTION OF THE EMBODIMENTS

Figure 2:
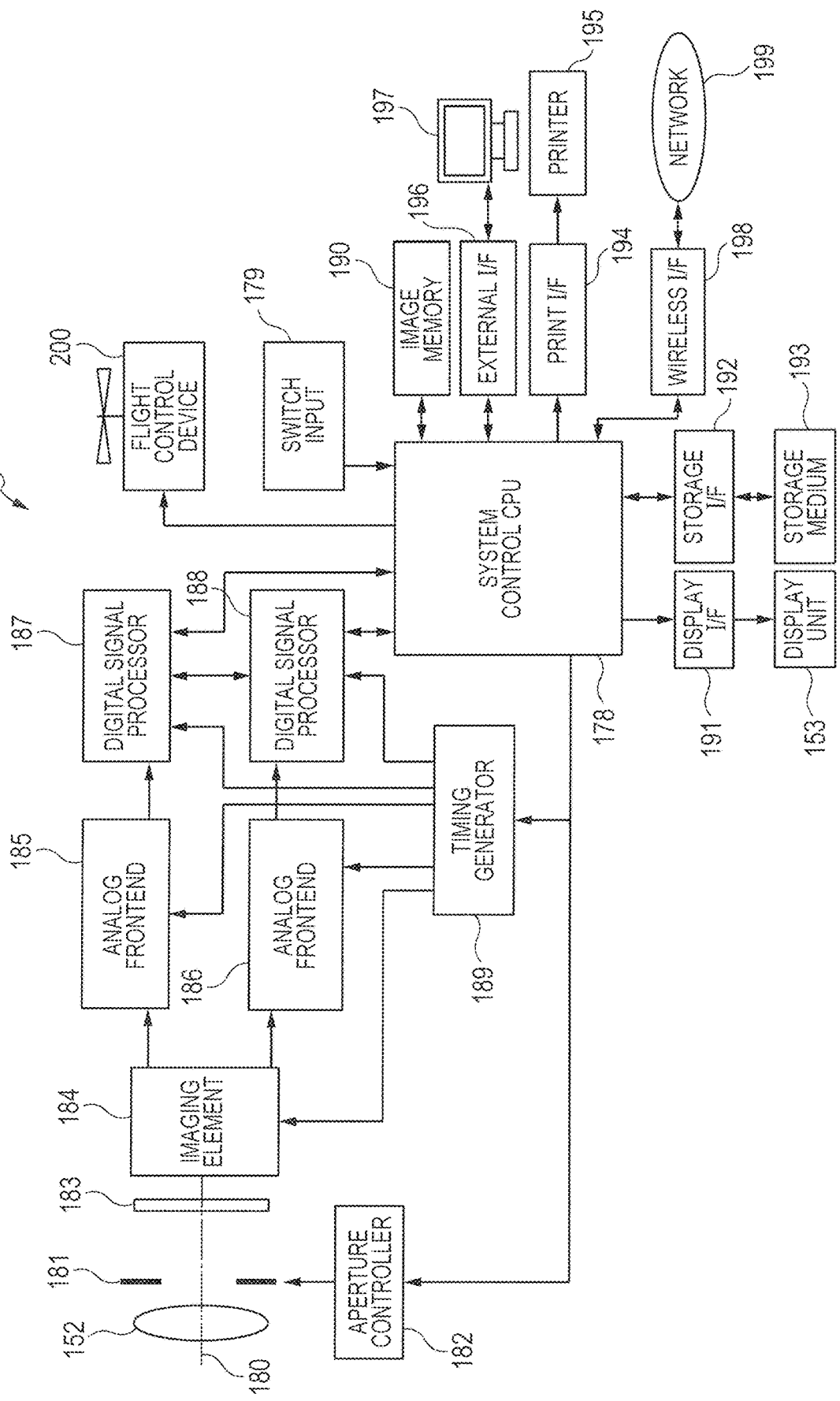
FIG. 2 is a block diagram illustrating a general configuration of the imaging device according to the first embodiment of the present invention.

Preferred embodiments of the present invention will now be described in detail in accordance with the accompanying drawings.

First Embodiment

In general, a faster shutter speed at a motion image capturing causes so-called jerkiness like a frame-by-frame video at reproduction resulting in a loss of a smoothness in a video. In order to suppress such jerkiness to have a smooth video, it is necessary to set accumulation time close to one frame period in a series of capturing. That is, when the framerate is 30 fps, a relatively longer accumulation time period such as 1/30 seconds or 1/60 seconds will be appropriate. In particular, this setting is important in a situation where a position of a camera is unstable such as in an aerial capturing.

On the other hand, in a static image, it is required to capture an image having a so-called stop motion effect that suppresses a blur to capture a moment. It is therefore necessary to set a short accumulation time period such as around 1/1000 second, for example. Further, since one frame period is short in a high framerate motion image, when the framerate is 120 fps, for example, a shorter accumulation time period such as 1/125 seconds or 1/250 seconds will necessarily be set.

Simultaneously capturing two images of a motion image and a static image or two images of a motion image of a normal framerate and a motion image of a high framerate through a single capturing lens means that an aperture used in these types of capturing is common to each other. Also in this case, it is desirable to obtain almost the same level of signal charges at imaging elements while two images are captured with different settings of the accumulation time period and thereby obtain both images with a good S/N ratio and less feeling of noise.

Further, a High Dynamic Range (HDR) technique for motion images is known as a technique for providing presence to a movie or a video on a television for home use. This is intended to provide more presence than in the conventional art by expanding the brightness reproduction range of a display screen and, mainly, by instantaneously or partially increasing the brightness. In order to complete this technique at a high level for the entire video from an input to an output, it is indispensable to expand the dynamic range at the device side that acquires the video.

In view of such a background, a technique for expanding the dynamic range by providing two pixel groups having different sensitivities in the imaging element within the imaging device and synthesizing outputs from these pixel groups has been proposed. Similarly, in this technique, it is desirable to create intermediate image data having a good S/N ratio and causing less feeling of noise from both the two pixel groups and be able to eventually synthesize a high quality HDR video.

In the present embodiment, first, a method for simultaneously capturing two images having different capturing conditions by using a single imaging element will be described. Note that, in the present embodiment, an imaging device in which an imaging optics and the like for a capturing is added to an image processing device adapted to process image signals output from an imaging element will be described as an example of a preferred embodiment of the present invention. However, the image processing device is not necessarily configured as a part of the imaging device and may instead be formed of hardware that is different from the imaging element or an imaging optics. Further, all of or a part of the functions of the image processing device may be installed in the imaging element.

FIG. 1A and FIG. 1B are external views of a digital still motion camera as an example of the imaging device according to the present embodiment. FIG. 1A illustrates a front view and FIG. 1B illustrates a backside view of the digital still motion camera. An imaging device 100 according to the present embodiment has a housing 151, an imaging optics 152 provided to the front face of the housing 151, a switch ST 154 provided on the top face of the housing 151, and a propeller 162. Further, the imaging device 100 has a display unit 153, a switch MV 155, a capturing mode selection lever 156, a menu button 157, up/down switches 158 and 159, a dial 160, and a playback button 161 on the back face of the housing 151.

The housing 151 is an enclosure that accommodates various functional parts of the imaging device 100 such as the imaging element and the like. The imaging optics 152 is an optics for capturing an optical image of an object. The display unit 153 is formed of a display device for displaying capturing information and/or one or more images. The display unit 153 may be provided with a movable mechanism for changing the orientation of a screen as necessity. The display unit 153 has a display intensity range that is sufficient for displaying even an image having a wide dynamic range without suppressing the intensity range thereof. The switch ST 154 is a shutter button used for mainly capturing a static image. The switch MV 155 is a button for starting and stopping a motion image capturing. The capturing mode selection lever 156 is a selection switch for selecting a capturing mode. The menu button 157 is a button for entering a function setting mode for setting a function of the imaging device 100. The up/down switches 158 and 159 are buttons used in changing various setting values. The dial 160 is a dial for changing various setting values. The playback button 161 is a button for entering a playback mode that causes an image stored in a storage medium accommodated in the imaging device 100 to be played back on the display unit 153. The propeller 162 is adapted to cause the imaging device 100 to float in the air for capturing an image from the air.

FIG. 2 is a block diagram illustrating the general configuration of the imaging device 100 according to the present embodiment. As illustrated in FIG. 2, the imaging device 100 has an aperture 181, an aperture controller 182, an optical filter 183, an imaging element 184, analog frontends 185 and 186, digital signal processors 187 and 188, and a timing generator 189. Further, the imaging device 100 has a system control CPU 178, a switch input 179, an image memory 190, and a flight control device 200. Further, the imaging device 100 has a display interface unit 191, a storage interface unit 192, a storage medium 193, a print interface unit 194, an external interface unit 196, and a wireless interface unit 198.

The imaging element 184 is adapted to convert an optical image of an object captured via the imaging optics 152 into an electrical image signal. Without being limited to a particular element, the imaging element 184 has such a number of pixels, a signal readout speed, a color gamut, and a dynamic range that are sufficient for satisfying the Ultra High Definition Television (UHDTV) specification. The aperture 181 is adapted to adjust the amount of a light passing through the imaging optics 152. The aperture controller 182 is adapted to control the aperture 181. The optical filter 183 is adapted to restrict a wavelength of a light entering the imaging element 184 and a space frequency traveling to the imaging element 184. The imaging optics 152, the aperture 181, the optical filter 183, and the imaging element 184 are arranged on an optical axis 180 of the imaging optics 152.

The analog frontends 185 and 186 are adapted to perform an analog signal processing and an analog-to-digital conversion of image signals output from the imaging element 184. The analog frontends 185 and 186 are formed of, for example, a correlated double sampling (CDS) circuit that removes noise, an amplifier that adjusts a signal gain, an A/D convertor that converts an analog signal into a digital signal, and the like. The digital signal processors 187 and 188 are adapted to apply various corrections to digital image data output from the analog frontends 185 and 186 and then compress the image data. The timing generator 189 is adapted to output various timing signals to the imaging element 184, the analog frontends 185 and 186, the digital signal processors 187 and 188. The system control CPU 178 is a controller that integrates execution of various calculations and entire control of the imaging device 100. The image memory 190 is adapted to temporarily store image data.

The display interface unit 191 is an interface that is provided between the system control CPU 178 and the display unit 153 and adapted to display a captured image on the display unit 153. The storage medium 193 is a storage medium such as a semiconductor memory for storing image data, additional data, and the like, and may be equipped to the imaging device 100 or may be removable. The storage interface unit 192 is an interface that is provided between the system control CPU 178 and the storage medium 193 and adapted to perform storage to the storage medium 193 or readout from the storage medium 193. The external interface 196 is an interface that is provided between the system control CPU 178 and external equipment adapted to communicate with the external equipment such as an external computer 197. The print interface unit 194 is an interface that is provided between the system control CPU 178 and a printer 195 and adapted to output a captured image to the printer 195 such as a compact inkjet printer for printing. The wireless interface unit 198 is an interface that is provided between the system control CPU 178 and a network 199 and adapted to communicate with the network 199 such as the internet. The switch input 179 includes the switch ST 154, the switch MV 155, and a plurality of switches for performing switching among various modes. The flight control device 200 is a control device for controlling the propeller 162 to fly the imaging device 100 for performing a capturing from the air.

Figure 3:
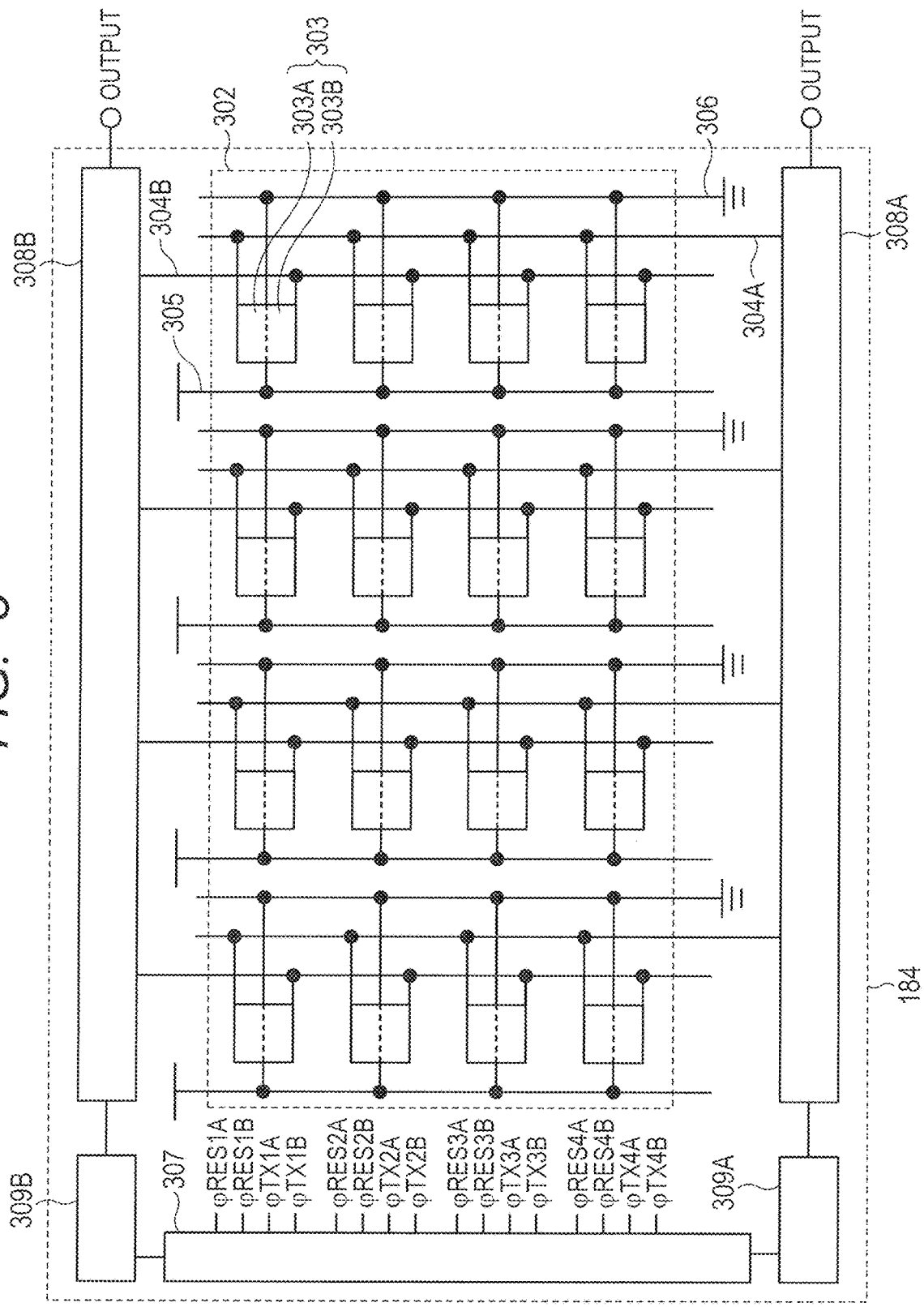
FIG. 3 is a block diagram illustrating a schematic configuration of an imaging element of the imaging device according to the first embodiment of the present invention.

FIG. 3 is a block diagram illustrating a configuration example of the imaging element 184. As illustrated in FIG. 3, the imaging element 184 includes a pixel array 302, a vertical scanning circuit 307, readout circuits 308A and 308B, and timing control circuits 309A and 309B.

A plurality of pixels 303 are arranged in a matrix in the pixel array 302. Note that, although a large number of the pixels 303 are included in the pixel array 302 in an actual implementation in general, only 16 pixels 303 arranged in a matrix with four rows by four columns are illustrated for simplifying the drawing in this example. Each of the plurality of pixels 303 has a pair of a pixel element 303A and a pixel element 303B. In FIG. 3, the upper area of the pixel 303 is denoted as the pixel element 303A and the lower area of the pixel 303 is denoted as the pixel element 303B. The pixel element 303A and the pixel element 303B each generate a signal by photoelectric conversion.

Signal output lines 304A and 304B extending in the column direction are provided on each column of the pixel array 302. The signal output line 304A on each column is connected to the pixel elements 303A that are associated with that column. Signals from the pixel elements 303A are output to the signal output line 304A. The signal output line 304B on each column is connected to the pixel elements 303B associated with that column. Signals from the pixel elements 303B are output to the signal output line 304B. A power source line 305 and a ground line 306 extending in the column direction are provided on each column of the pixel array 302. The power source line 305 and the ground line 306 on each column are connected to the pixels 303 that are associated with that column. The power source line 305 and the ground line 306 may be signal lines extending in the row direction.

The vertical scanning circuit 307 is arranged adjacent in the row direction to the pixel array 302. The vertical scanning circuit 307 outputs predetermined control signals for controlling readout circuits within the pixels 303 on a row basis to the plurality of pixels 303 of the pixel array 302 via control lines (not illustrated) arranged extending in the row direction. FIG. 3 depicts reset pulses φRESnA and φRESnB and transfer pulses φTXnA and φTXnB as control signals (n is an integer corresponding to the row number).

The readout circuits 308A and 308B are arranged adjacent to the pixel array 302 in the column direction so as to interpose the pixel array 302. The readout circuit 308A is connected to the signal output line 304A on each column. By selectively activating the signal output lines 304A on respective columns in a sequential manner, the readout circuit 308A sequentially reads out signals from the signal output lines 304A on respective columns and performs a predetermined signal processing. In the same manner, the readout circuit 308B is connected to the signal output line 304B on each column. By selectively activating the signal output lines 304B on respective columns in a sequential manner, the readout circuit 308B sequentially reads out signals from the signal output lines 304B on respective columns and performs a predetermined signal processing. The readout circuits 308A and 308B may include a noise removal circuit, an amplification circuit, an analog-to-digital conversion circuit, a horizontal scanning circuit, and the like, respectively, and sequentially outputs signals that have been subjected to such a predetermined signal processing.

The timing control circuit 309A is connected to the vertical scanning circuit 307 and the readout circuit 308A. The timing control circuit 309A outputs a control signal that controls a driving timing of the vertical scanning circuit 307 and the readout circuit 308A. The timing control circuit 309B is connected to the vertical scanning circuit 307 and the readout circuit 308B. The timing control circuit 309B outputs a control signal that controls a driving timing of the vertical scanning circuit 307 and the readout circuit 308B.

Figure 4:
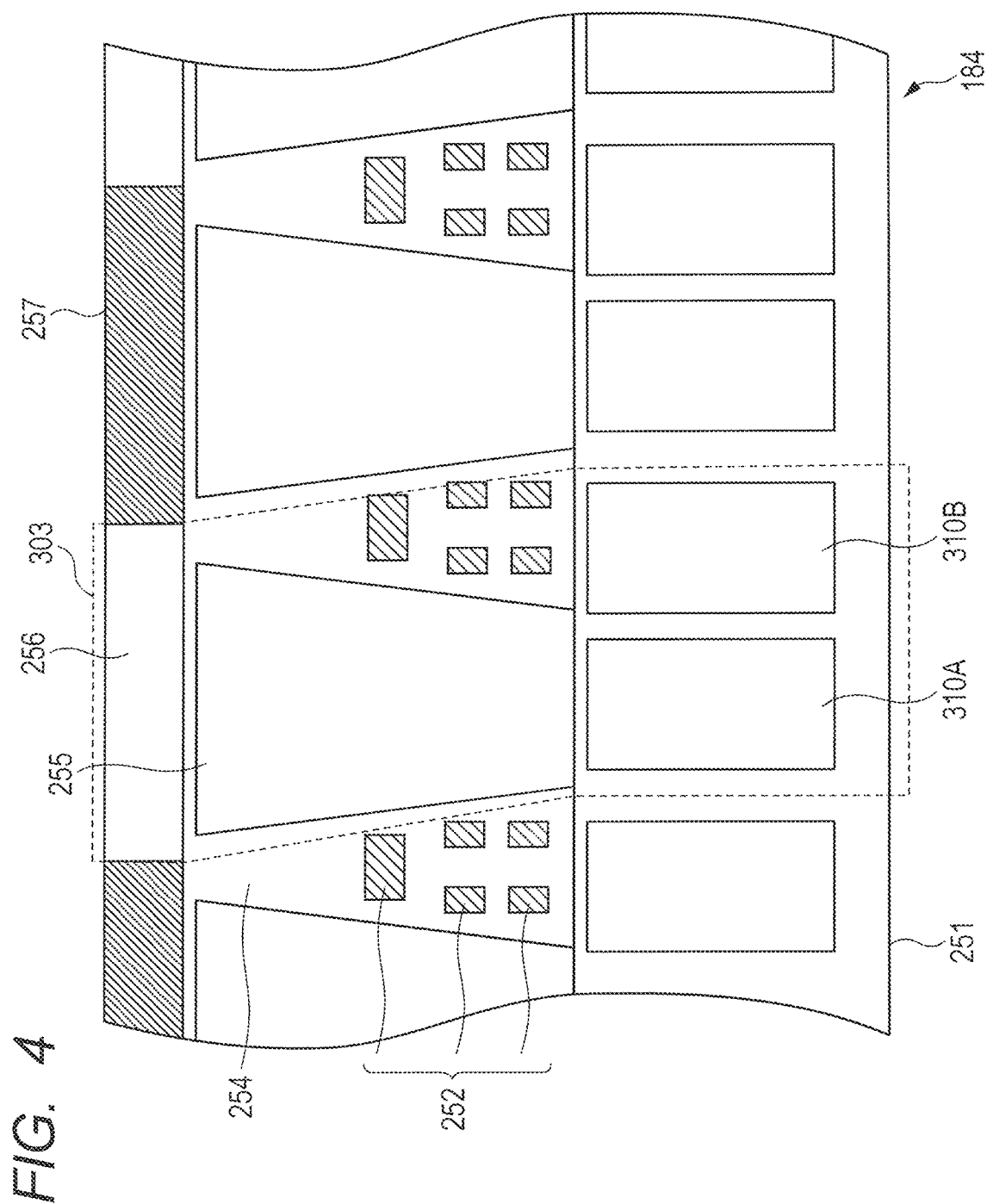
FIG. 4 is a sectional view illustrating internal structure of the imaging element in the imaging device according to the first embodiment of the present invention.

FIG. 4 is a sectional view illustrating the internal structure of the pixels 303 of the imaging element 184. As illustrated in FIG. 4, each of the pixels 303 includes two photodiodes 310A and 310B, a light guide 255, and a color filter 256. The photodiode 310A forms a part of the pixel element 303A, and the photodiode 310B forms a part of the pixel element 303B. The photodiodes 310A and 310B are provided inside a silicon substrate 251. The light guide 255 is provided inside an insulating layer 254 provided on the silicon substrate 251. The insulating layer 254 is formed of silicon oxide, for example, and the light guide 255 is formed of a material such as silicon nitride whose refractive index is higher than that of the insulating layer 254, for example. A wiring layer 252 is provided in the insulating layer 254 between the light guides 255. On the light guide 255, a color filter 256 having a predetermined spectral transmission factor characteristic is provided. Note that FIG. 4 depicts an example in which color filters for two neighboring pixels 303 are formed of color filters 256 and 257 whose spectral transmission factor characteristics are different from each other.

The light guide 255 has a property of confining a light therein due to a difference in the refractive index from the insulating layer 254. This allows an incident light through the color filter 256 to be guided to the photodiodes 310A and 310B by the light guide 255. The photodiodes 310A and 310B are arranged asymmetrically with respect to the light guide 255, and a light flux that has traveled through the light guide 255 enters the photodiode 310A at a high efficiency and enters the photodiode 310B at a low efficiency. Furthermore, the light guide 255 is configured such that, with adjustment of the depth and the taper angle thereof, unbalance is eliminated in the incident angle property with respect to the incident light flux that can be effectively photoelectrically-converted by the photodiodes 310A and 310B.

Figure 5:
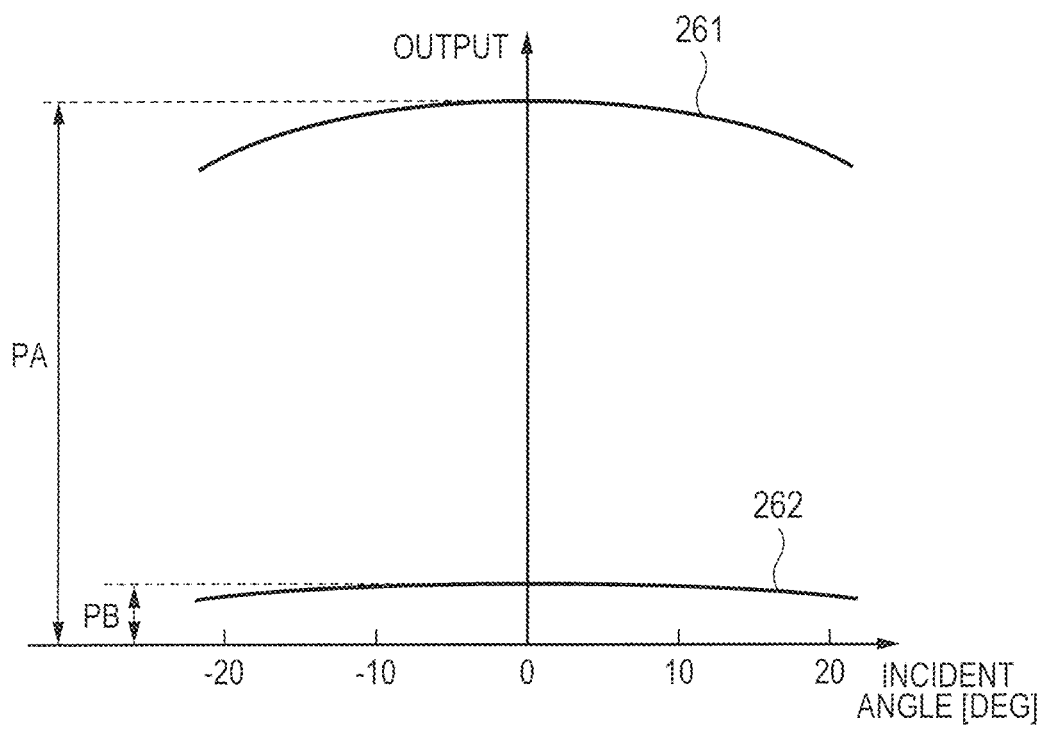
FIG. 5 is a graph illustrating a relationship between an angle of a light beam entering a pixel and an output from a photodiode.

FIG. 5 is a graph illustrating a relationship between an incident angle of a light beam entering a pixel and an output from a photodiode. In FIG. 5, the horizontal axis represents an incident angle of a light beam entering a pixel, and the vertical axis represents an output from a photodiode. FIG. 5 illustrates an output characteristic 261 from the photodiode 310A and an output characteristic 262 from the photodiode 310B.

As illustrated in FIG. 5, the output characteristic 261 and the output characteristic 262 each have a symmetrical, slightly convex shape having a peak when the incident angle of a light beam is zero. Further, a peak intensity PB of the output characteristic 262 is around one-eighth a peak intensity PA of the output characteristic 261. This means that the photodiodes 310A and 310B each have little dependency on the incident angle and the photodiode 310B has one-eighth the light-receiving efficiency of the photodiode 310A. That is, this means that, in terms of a setting value of the ISO sensitivity, the photodiode 310B has a sensitivity that is lower by three steps than that of the photodiode 310A.

Next, a relationship between the imaging optics 152 and the imaging element 184 will be described in further details by using FIG. 6A and FIG. 6B. FIG. 6A and FIG. 6B are diagrams illustrating a relationship between the imaging optics 152 and the imaging element 184. FIG. 6A is a diagram of the imaging optics 152 when viewed from the direction of the optical axis 180 thereof. FIG. 6B is a diagram illustrating a portion from the imaging optics 152 to the imaging element 184 of FIG. 2 in further details.

It is assumed that the imaging element 184 includes a pixel 276 located in the center of a capturing area and a pixel 277 located near an outer edge of the capturing area as illustrated in FIG. 6A. In this case, the pixel 276 can receive light fluxes from an area surrounded by a light beam 272 and a light beam 273. Further, the pixel 277 can receive light fluxes from an area surrounded by a light beam 274 and a light beam 275. In this case, since a field lens 270 is arranged between the optical filter 183 and the imaging optics 152, a light flux received by the pixel 276 and a light flux received by the pixel 277 overlap as depicted by an area 271 in FIG. 6A near the imaging optics 152. As a result, it is possible for any of the pixels to receive a light flux from the imaging optics 152 at a high efficiency.

Figures 7A, 7B, 7C:
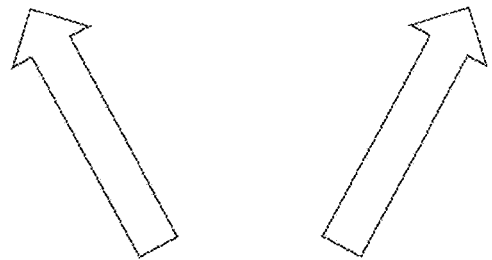
FIG. 7A, FIG. 7B, and FIG. 7C are schematic diagrams illustrating image signals output from the imaging elements.

FIG. 7A to FIG. 7C are schematic diagrams illustrating image signals output from the imaging element. Let us assume here a case where color filters 256 having predetermined spectral transmission factor characteristics are arranged according to a color filter alignment 281 illustrated in FIG. 7A in the pixel array 302. FIG. 7A schematically depicts the pixel array 302 in which the pixels 303 are aligned in a matrix of six rows by eight columns and respective colors of the color filters 256 arranged in respective pixels. In FIG. 7A, each R represents a red color filter, each of G1 and G2 represents a green color filter, and each B represents a blue color filter. The depicted color filter alignment 281 is a color filter alignment that is a so called Bayer arrangement, in which the color filters 256 in respective colors are arranged with repetition such as "G1, B, G1, B . . . ", "R, G2, R, G2 . . . ", "G1, B, G1, B . . . ", and " . . . " on a row basis.

From the pixel array 302 having such the color filter alignment 281, output data 282 and 283 illustrated in FIG. 7B and FIG. 7C are obtained. In FIG. 7B, each of g1A and g2A represents an output from the pixel elements 303A of the pixels 303 on which a green color filter is arranged. Each bA represents an output from the pixel elements 303A of the pixels 303 on which a blue color filter is arranged. Each rA represents an output from the pixel elements 303A of the pixels 303 on which a red color filter is arranged. In FIG. 7C, each of g1B and g2B represents an output from the pixel elements 303B of the pixels 303 on which a green color filter is arranged. Each bB represents an output from the pixel elements 303B of the pixels 303 on which a blue color filter is arranged. Each rB represents an output from the pixel elements 303B of the pixels 303 on which a red color filter is arranged.

As having been described by using FIG. 3, two outputs from the readout circuits 308A and 308B are obtained from the imaging element 184, one of which is the output data 282 illustrated in FIG. 7B and the other is the output data 283 illustrated in FIG. 7C. The output data 282 will be an image signal picture A after predetermined signal processing. Also, the output data 283 will be an image signal picture B after predetermined signal processing. In the following description, an image signal based on the output data 282 is denoted as "picture A" and an image signal based on the output data 283 is denoted as "picture B". Note that, although the picture A, and the picture B are image signals after subjected to a predetermined process such as a correction in a strict sense, image signals before a correction or during a correction may also be denoted as picture A and picture B for simplified illustration. Further, images obtained based on the image signals picture A and picture B may also be denoted as picture A and picture B, respectively.

Figure 8:
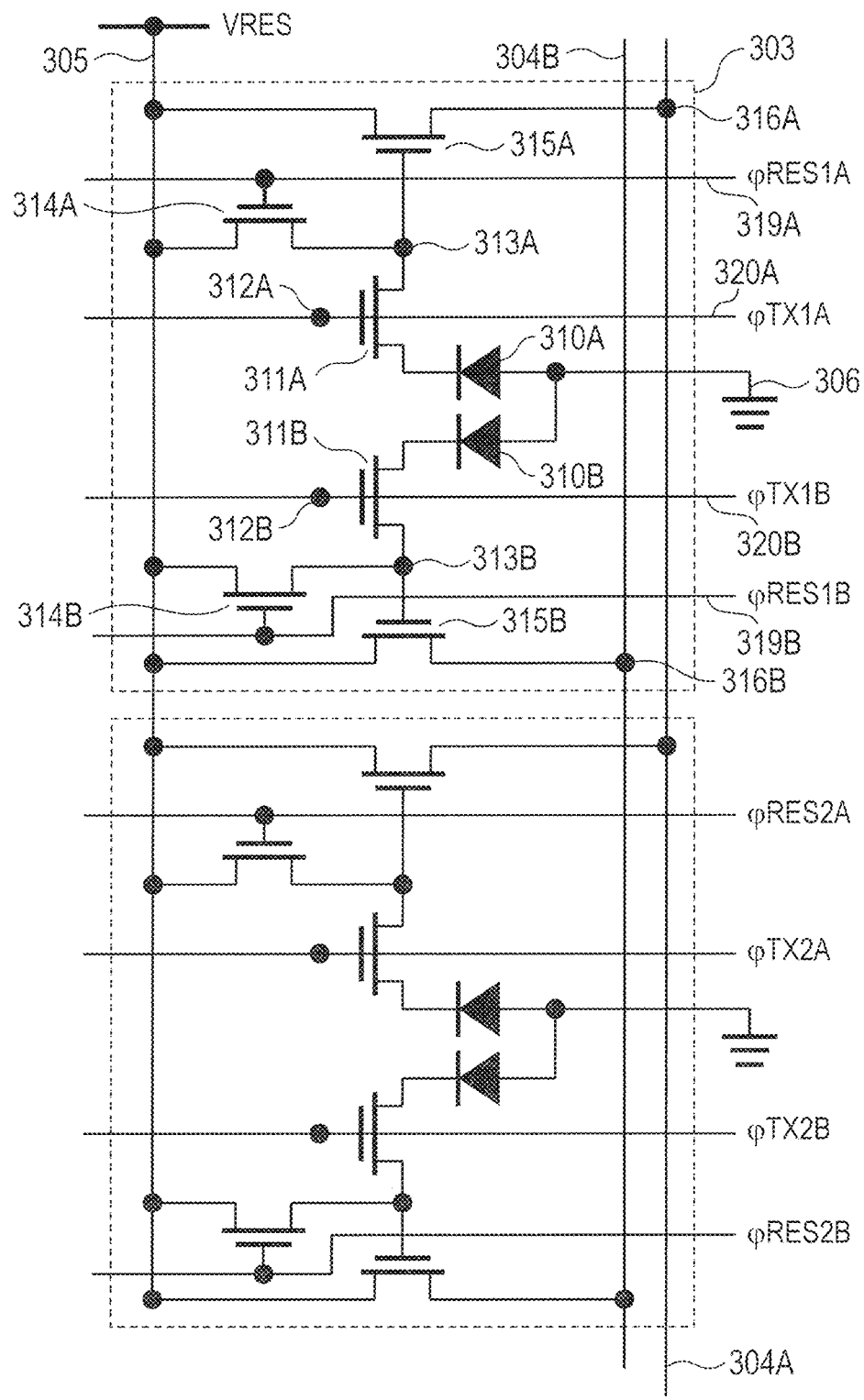
FIG. 8 is a circuit diagram illustrating a configuration example of pixels in the imaging element of the imaging device according to the first embodiment of the present invention.

FIG. 8 is a circuit diagram illustrating a configuration example of the pixel 303. The pixel 303 has the pixel element 303A and the pixel element 303B as described above. The pixel element 303A has a photodiode 310A, a transfer transistor 311A, a floating diffusion region 313A, a reset transistor 314A, and an amplification transistor 315A. The pixel element 303B has a photodiode 310B, a transfer transistor 311B, a floating diffusion region 313B, a reset transistor 314B, and an amplification transistor 315B. Note that the photodiode 310A corresponds to the photodiode 310A illustrated in FIG. 4 and the photodiode 310B corresponds to the photodiode 310B illustrated in FIG. 4.

The anode of the photodiode 310A is connected to the ground line 306, and the cathode of the photodiode 310A is connected to the source of the transfer transistor 311A. The drain of the transfer transistor 311A is connected to the source of the reset transistor 314A and the gate of the amplification transistor 315A. A connection node of the drain of the transfer transistor 311A, the source of the reset transistor 314A, and the gate of the amplification transistor 315A forms a floating diffusion region 313A. The drain of the reset transistor 314A and the drain of the amplification transistor 315A are connected to the power source line 305. The source of the amplification transistor 315A forming an image signal output portion 316A is connected to the signal output line 304A.

In the same manner, the anode of the photodiode 310B is connected to the ground line 306, and the cathode of the photodiode 310B is connected to the source of the transfer transistor 311B. The drain of the transfer transistor 311B is connected to the source of the reset transistor 314B and the gate of the amplification transistor 315B. A connection node of the drain of the transfer transistor 311B, the source of the reset transistor 314B, and the gate of the amplification transistor 315B forms a floating diffusion region 313B. The drain of the reset transistor 314B and the drain of the amplification transistor 315B are connected to the power source line 305. The source of the amplification transistor 315B forming an image signal output portion 316B is connected to the signal output line 304B.

The pixels 303 on each column are connected to reset control lines 319A and 318B and transfer control lines 320A and 320B arranged in the row direction from the vertical scanning circuit 307. The reset control line 319A is connected to the gate of the reset transistor 314A. Similarly, the reset control line 319B is connected to the gate of the reset transistor 314B. The transfer control line 320A is connected to the gate of the transfer transistor 311A via a contact portion 312A. Similarly, the transfer control line 320B is connected to the gate of the transfer transistor 311B via a contact portion 312B. The reset control line 319A supplies, to the gate of the reset transistor 314A, the reset pulse ϕRESnA output from the vertical scanning circuit 307. Similarly, the reset control line 319B supplies, to the gate of the reset transistor 314B, the reset pulse ϕRESnB output from the vertical scanning circuit 307. The transfer control line 320A supplies, to the gate of the transfer transistor 311A, the transfer pulse φTXnA output from the vertical scanning circuit 307. Similarly, the transfer control line 320B supplies, to the gate of the transfer transistor 311B, the transfer pulse φTXnB output from the vertical scanning circuit 307. Note that the number n added in the reset pulses φRESnA and φRESnB and the transfer pulses φTXnA and φTXnB is an integer corresponding to the row number. FIG. 8 depicts labels in which n is replaced with the integer corresponding to the row number.

The photodiode 310A is a first photoelectric conversion unit that generates and accumulates charges by photoelectric conversion, and the photodiode 310B is a second photoelectric conversion unit that generates and accumulates charges by photoelectric conversion. The floating diffusion regions 313A and 313B are regions that hold charges. The transfer transistor 311A is adapted to transfer charges generated by the photodiode 310A to the floating diffusion region 313A. The transfer transistor 311B is adapted to transfer charges generated by the photodiode 310B to the floating diffusion region 313B.

In response to an output of a high-level transfer pulse φTXnA from the vertical scanning circuit 307, the transfer transistor 311A is turned on and the photodiode 310A and the floating diffusion region 313A are connected to each other. In the same manner, in response to an output of a high-level transfer pulse φTXnB from the vertical scanning circuit 307, the transfer transistor 311B is turned on and the photodiode 310B and the floating diffusion region 313B are connected to each other. In response to an output of a high-level reset pulse φRESnA from the vertical scanning circuit 307, the reset transistor 314A is turned on and the photodiode 310A and the floating diffusion region 313A are reset. In the same manner, in response to an output of a high-level reset pulse φRESnB from the vertical scanning circuit 307, the reset transistor 314B is turned on and the photodiode 310B and the floating diffusion region 313B are reset.

In response to an output of a low-level transfer pulse φTXnA from the vertical scanning circuit 307, the transfer transistor 311A is turned off and the photodiode 310A starts accumulation of signal charges generated by photoelectric conversion. Subsequently, in response to an output of a high-level transfer pulse φTXnA from the vertical scanning circuit 307, the transfer transistor 311A is turned on and the signal charges of the photodiode 310A are transferred to the floating diffusion region 313A. In response, the amplification transistor 315A amplifies an input that is based on a voltage value of the floating diffusion region 313A in accordance with the amount of signal charges transferred from the photodiode 310A and outputs the amplified input to the signal output line 304A.

In the same manner, in response to an output of a low-level transfer pulse φTXnB from the vertical scanning circuit 307, the transfer transistor 311B is turned off and the photodiode 310B starts accumulation of signal charges generated by photoelectric conversion. Subsequently, in response to an output of a high-level transfer pulse φTXnB from the vertical scanning circuit 307, the transfer transistor 311B is turned on and the signal charges of the photodiode 310B are transferred to the floating diffusion region 313B. In response, the amplification transistor 315B amplifies an input that is based on a voltage value of the floating diffusion region 313B in accordance with the amount of signal charges transferred from the photodiode 310B and outputs the amplified input to the signal output line 304B.

Figure 9:
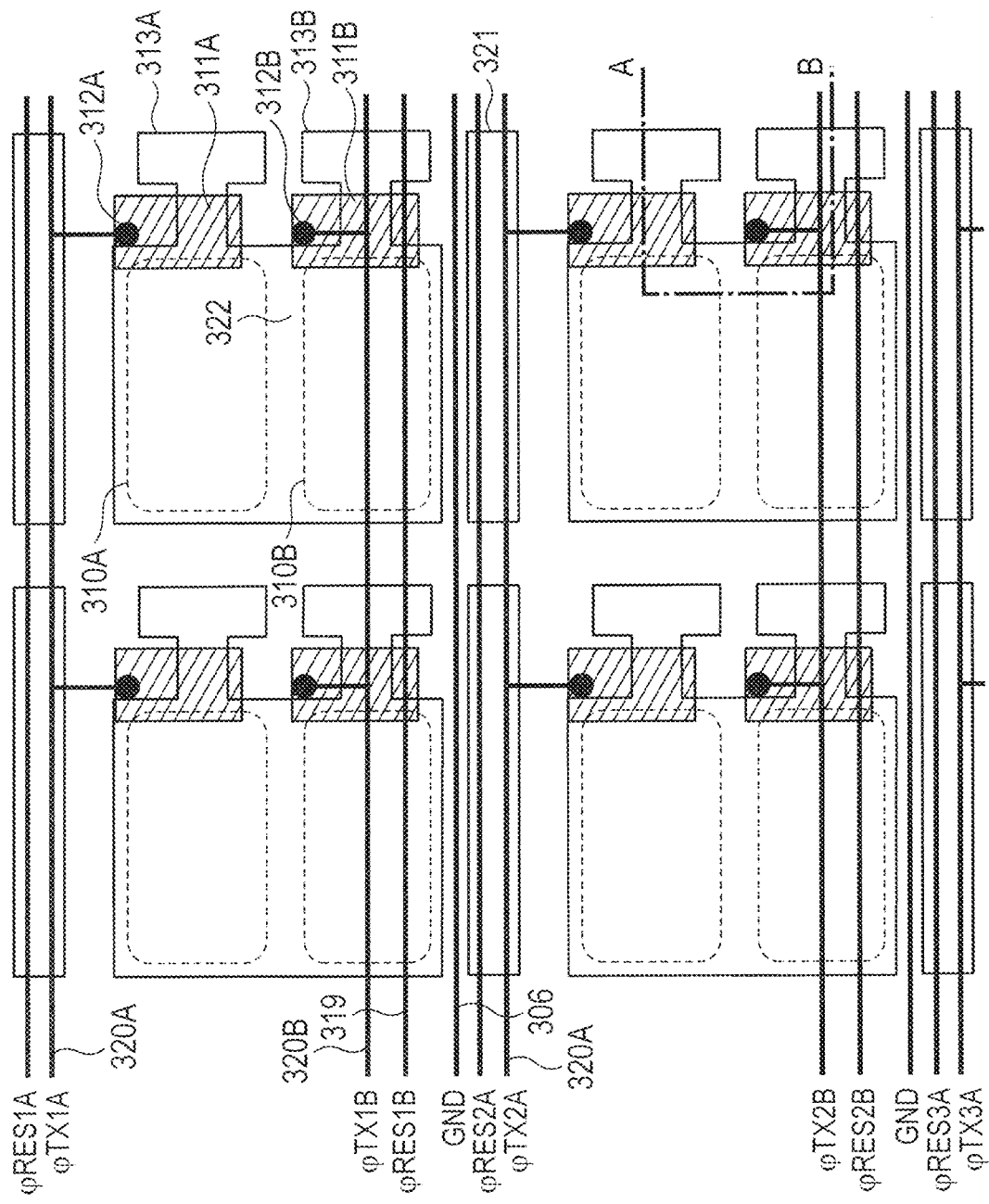
FIG. 9 is a plan layout diagram illustrating a primary portion of the pixels in the imaging element of the imaging device according to the first embodiment of the present invention.
Figure 10:
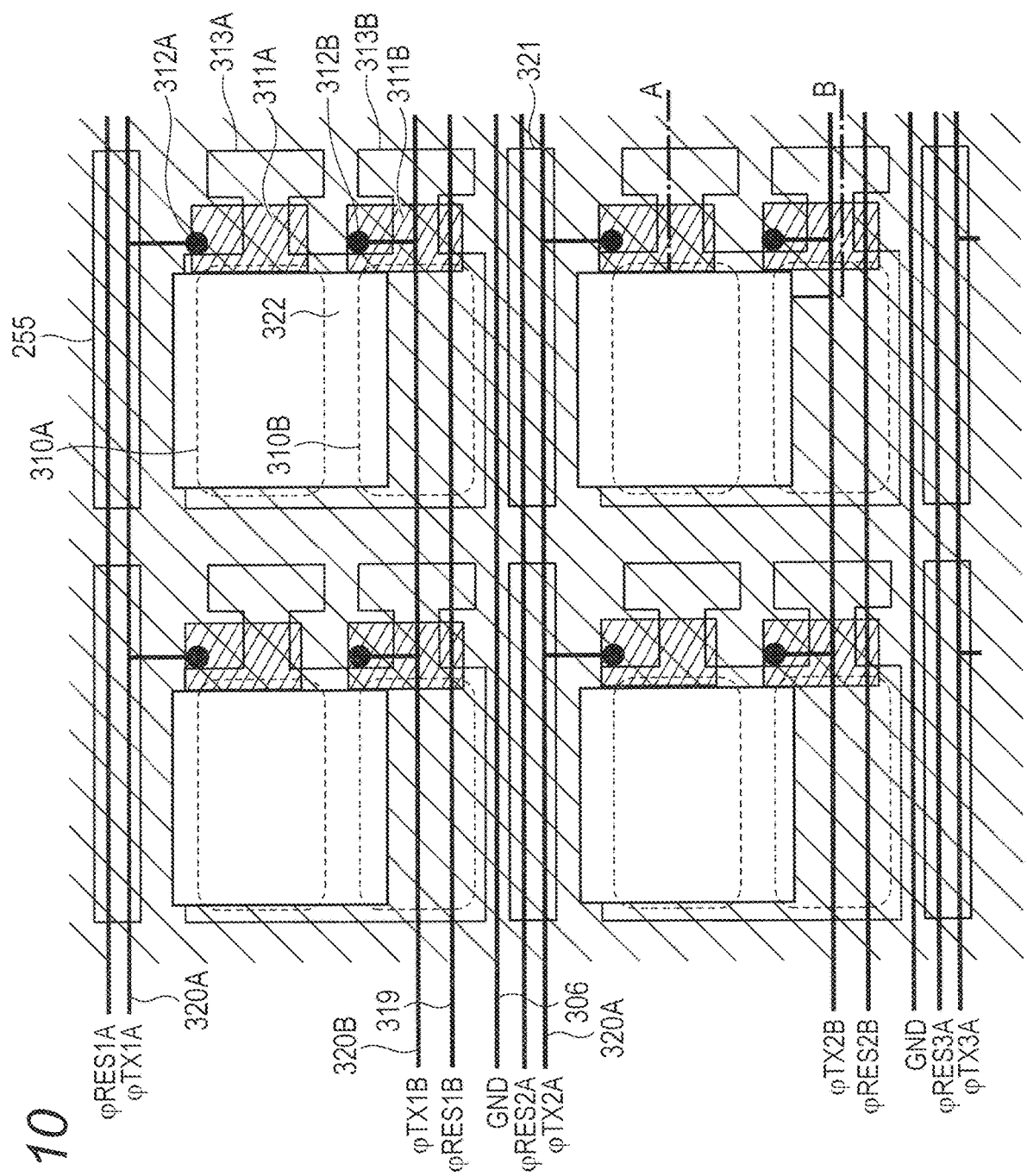
FIG. 10 is a plan layout diagram illustrating a primary portion including a light guide of the pixels of the imaging element of the imaging device according to the first embodiment of the present invention.

FIG. 9 and FIG. 10 is a plan layout diagram illustrating a primary portion of the pixels 303. FIG. 9 illustrates the photodiodes 310A and 310B, the transfer transistors 311A and 311B, and the floating diffusion regions 313A and 313B of the components of the pixel 303. Other circuit elements including the reset transistors 314A and 314B and the amplification transistors 315A and 315B are represented as a readout circuit 321 in FIG. 9 and FIG. 10, and the detailed depiction thereof is omitted. Further, the signal output lines 304A and 304B and the power source line 305 arranged in the vertical direction of the pixels 303 are omitted and contact points of the reset control line 319, the power source line 305, and the ground line 306 are omitted. FIG. 10 depicts the light guide 255 illustrated in FIG. 4 in addition to the components illustrated in FIG. 9. In the light guide 255, a hatched portion indicates a low refractive index area and white portions indicate high refractive index areas, that is, light guide portions.

In FIG. 9 and FIG. 10, the contact point 312A is a contact point that connects the transfer control line 320A to the gate of the transfer transistor 311A. The contact point 312B is a contact point that connects the transfer control line 320B to the gate of the transfer transistor 311B. Each of the photodiodes 310A and 310B is a photoelectric conversion unit that performs photoelectric conversion and has a first conduction type (for example, P type) semiconductor region and a second conduction type (for example, N type) semiconductor region (an N type electron accumulation region) forming a PN junction with the first conduction type semiconductor region. The second conduction type semiconductor region of the photodiode 310A and the second conduction type semiconductor region of the photodiode 310B are separated from each other by a separation portion 322.

The transfer transistors 311A and 311B, the contact points 312A and 312B, and the transfer control lines 320A and 320B are arranged in a symmetrical manner or substantially a symmetrical manner with respect to the separation portion 322 located between the photodiodes 310A and 310B, respectively. On the other hand, the light guide 255 is arranged in a position asymmetrical with respect to the separation portion 322 as illustrated in FIG. 10. That is, while the photodiode 310A occupies a large area of a bottom portion of the light guide 255, the photodiode 310B only slightly overlaps with the bottom portion of the light guide 255. As a result, the light-receiving efficiency of the photodiode 310A is higher and the light-receiving efficiency of the photodiode 310B is lower.

In the imaging element 184 according to the present embodiment, the ratio of the light-receiving efficiencies of the photodiodes 310A and 310B is set to around 8:1, that is, the difference of the sensitivity is set to around three steps. Further, almost the same level of signal charges are obtained in pixel elements while two images are captured with different accumulation time settings, which contributes to provide both images having a good S/N ratio and causing less feeling of noise or allow a high quality HDR image to be synthesized. Details thereof will be described later.

Figure 11:
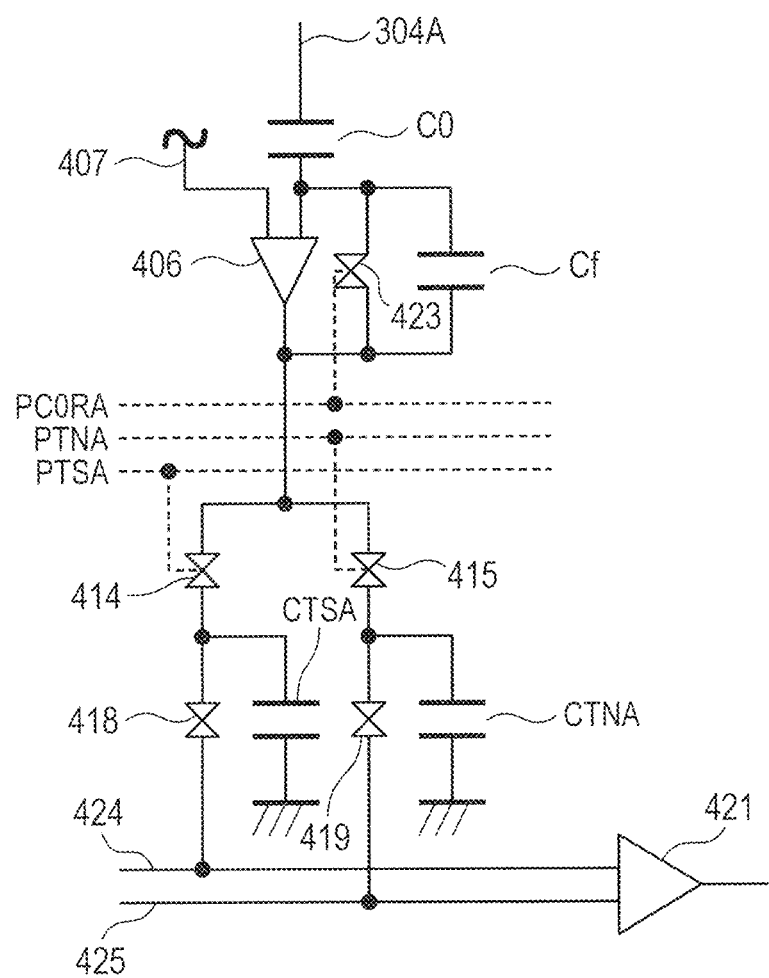
FIG. 11 is a circuit diagram illustrating a configuration of a readout circuit in the imaging device according to the first embodiment of the present invention.

FIG. 11 is a circuit diagram illustrating a configuration example of a readout circuit of the imaging element 184. Note that, in FIG. 11, reference numerals of some components are labeled with "A" in the ends thereof preparing for a case of the readout circuit 308A. It should be understood that, in a case of the readout circuit 308B, corresponding reference numerals will be labeled with "B" in the ends thereof.

As illustrated in FIG. 11, the readout circuit 308A includes a clamp capacitor C0, a feedback capacitor Cf, an operational amplifier 406, a reference voltage source 407, and a switch 423. One of the input terminals of the operational amplifier 406 is connected to the signal output line 304A via the clamp capacitor CO. The feedback capacitor Cf and the switch 423 are connected in parallel between the one of the input terminals and the output terminal of the operational amplifier 406. The other input terminal of the operational amplifier 406 is connected to a reference voltage source 407. The reference voltage source 407 is adapted to supply a reference voltage Vref to the operational amplifier 406. The switch 423 is a switch controlled by a signal PC0RA and is turned on to short-circuit both ends of the feedback capacitor Cf when the signal PC0RA is a high level.

The readout circuit 308A further includes switches 414, 415, 418, and 419, a capacitor CTSA, a capacitor CTNA, horizontal output lines 424 and 425, and an output amplifier 421. The switches 414 and 415 are switches adapted to control writing of pixel signals to the capacitors CTSA and CTNA. The switch 414 is a switch controlled by a signal PTSA and is turned on to connect the output terminal of the operational amplifier 406 to the capacitor CTSA when the signal PTSA is a high level. The switch 415 is a switch controlled by a signal PTNA and is turned on to connect the output terminal of the operational amplifier 406 to the capacitor CTNA when the signal PTNA is a high level.

The switches 418 and 419 are switches adapted to control outputs of image signals held in the capacitors CTSA and CTNA to the output amplifier 421. The switches 418 and 419 are turned on in response to control signals from a horizontal shift resistor. This causes a signal written to the capacitor CTSA to be output to the output amplifier 421 via the switch 418 and the horizontal output line 424. Further, a signal written to the capacitor CTNA is output to the output amplifier 421 via the switch 419 and the horizontal output line 425. The signals PC0RA, PTNA, and PTSA are signals supplied from the timing generator 189 under the control of the system control CPU 178.

The readout circuit 308B also has the same configuration as that of the readout circuit 308A. Further, signals PC0RB, PTNB, and PTSB in the following description are signals supplied from the timing generator 189 under the control of the system control CUP 178. The signals PC0RB, PTNB, and PTSB in the readout circuit 308B are responsible for the same functions as the signals PC0RA, PTNA, PTSA in the readout circuit 308A.

Next, operations of reset, accumulation, and readout in the imaging element 184 will be described one by one with respect to an example of a readout operation from the pixels 303 on the first row by using a timing chart of FIG. 12.

First, at time t1, the vertical scanning circuit 307 causes the transfer pulse φTX1B output to the transfer control line 320B to transition from a low level to a high level. Thereby, the transfer transistor 311B is turned on. At this time, a high-level reset pulse φRES1B is being output to the reset control line 319B from the vertical scanning circuit 307, and the reset transistor 314B is also in an on-state. Thereby the photodiode 310B is connected to the power source line 305 via the transfer transistor 311B and the reset transistor 314B resulting in a reset state. At this time, the floating diffusion region 313B is also in a reset state.

Subsequently, at time t2, the vertical scanning circuit 307 causes the transfer pulse φTX1B to transition from a high level to a low level. Thereby, the transfer transistor 311B is turned off and accumulation of signal charges by photoelectric conversion starts in the photodiode 310B.

Subsequently, at time t3, the vertical scanning circuit 307 causes the transfer pulse φTX1A, which is output to the transfer control line 320A, to transition from a high level to a low level. Thereby, the transfer transistor 311A is turned on. At this time, a high-level reset pulse φRES1A is being output to the reset control line 319A from the vertical scanning circuit 307, and thus the reset transistor 314A is also in an on-state. Thereby, the photodiode 310A is connected to the power source line 305 via the transfer transistor 311A and the reset transistor 314A to be in a reset state. At this time, the floating diffusion region 313A is also in a reset state.

Subsequently, at time t4, the vertical scanning circuit 307 causes the transfer pulse φTX1A to transition from a high level to a low level. Thereby, the transfer transistor 311A is turned off, accumulation of signal charges by photoelectric conversion is started in the photodiode 310A.

Subsequently, at time t5, the vertical scanning circuit 307 causes the reset pulse φRES1A to transition from a high level to a low level. Thereby, the reset transistor 314A is turned off to unlatch the reset of the floating diffusion region 313A.

Thereby, the potential of the floating diffusion region 313A is read out to the signal output line 304A via the amplification transistor 315A an image signal as a reset signal level and input to the readout circuit 308A.

At the time t5, the signal PC0RA of a high level is output to the readout circuit 308A from the timing generator 189, and the switch 423 is in an on-state. Thus, an image signal of a reset signal level is input from the pixel element 303A to the readout circuit 308A with the operational amplifier 406 buffering the output of the reference voltage Vref.

Subsequently, at time t6, the signal PC0RA output from the timing generator 189 to the readout circuit 308A transitions from a high level to a low level to turn off the switch 423.

Subsequently, at time t7, the signal PTNA output from the timing generator 189 to the readout circuit 308A transitions from a low level to a high level to turn on the switch 415 and write the output at this time of the operational amplifier 406 to the capacitor CTNA.

Subsequently, at time t8, the signal PTNA output from the timing generator 189 to the readout circuit 308A transitions from a high level to a low level to turn off the switch 415 and complete writing to the capacitor CTNA.

Subsequently, at time t9, the vertical scanning circuit 307 causes the transfer pulse φTX1A to transition from a low level to a high level to turn on the transfer transistor 311A. Thereby, signal charges accumulated in the photodiode 310A are transferred to the floating diffusion region 313A.

Subsequently, at time t10, the vertical scanning circuit 307 causes the transfer pulse φTX1A to transition from a high level to a low level to turn off the transfer transistor 311A. Thereby, readout of signal charges accumulated in the photodiode 310A to the floating diffusion region 313A is complete.

Thereby, the potential of the floating diffusion region 313A changed by signal charges is read out to the signal output line 304A via the amplification transistor 315A as an optical signal level and input to the readout circuit 308A.

Then, in the readout circuit 308A, a voltage resulted after an inversion gain has been applied to a voltage change at a capacitance ratio of the clamp capacitor CO and the feedback capacitor Cf is output from the operational amplifier 406.

Subsequently, at time t11, the signal PTSA output from the timing generator 189 to the readout circuit 308A transitions from a low level to a high level to turn on the switch 414 and write the output at this time of the operational amplifier 406 to the capacitor CTSA.

Subsequently, at time t12, the signal PTSA output from the timing generator 189 to the readout circuit 308A transitions from a high level to a low level to turn off the switch 414 and complete writing to the capacitor CTSA.

Subsequently, at time t13, the vertical scanning circuit 307 causes the reset pulse ϕRES1A to transition from a low level to a high level to turn of the reset transistor 314A. Thereby, the floating diffusion region 313A is connected to the power source line 305 via the reset transistor 314A to enter a reset state.

Subsequently, at time t14, the vertical scanning circuit 307 causes the reset pulse ϕRES1B to transition from a high level to a low level. Thereby, the reset transistor 314B is turned off to unlatch a reset of the floating diffusion region 313B.

Thereby, the potential of the floating diffusion region 313B is read out to the signal output line 304B via the amplification transistor 315B as an image signal in a reset signal level and input to the readout circuit 308B.

At the time t14, a high-level signal PC0RB is output to the readout circuit 308B from the timing generator 189 and thus the switch 423 is in an on-state. Therefore, an image signal in a reset signal level is input from the pixel element 303B to the readout circuit 308B with the operational amplifier 406 being buffering the output of the reference voltage Vref.

Subsequently, at time t15, the signal PC0RB output from the timing generator 189 to the readout circuit 308B transitions from a high level to a low level to turn off the switch 423.

Subsequently, at time t16, the signal PTNB output from the timing generator 189 to the readout circuit 308B transitions from a low level to a high level to turn on the switch 415 and write the output at this time of the operational amplifier 406 to the capacitor CTNB.

Subsequently, at time t17, the signal PTNB output from the timing generator 189 to the readout circuit 308B transitions from a high level to a low level to turn off the switch 415 and complete writing to the capacitor CTNB.

Subsequently, at time t18, the vertical scanning circuit 307 causes the transfer pulse ϕTX1B to transition from a low level to a high level to turn on the transfer transistor 311B. Thereby, signal charges accumulated in the photodiode 310B are transferred to the floating diffusion region 313B.

Thereby, the intermediate time between the starting time and the ending time of an accumulation period (hereafter, referred to as "intermediate time of an accumulation period") of the photodiode 310A and the intermediate time of an accumulation period of the photodiode 310B are matched at time tc.

Subsequently, at time t19, the vertical scanning circuit 307 causes the transfer pulse ϕTX1B to transition from a high level to a low level to turn off the transfer transistor 311B. Thereby, readout of signal charges accumulated in the photodiode 310B to the floating diffusion region 313B is complete.

Thereby, the potential of the floating diffusion region 313B changed by signal charges is read out to the signal output line 304B via the amplification transistor 315B as an optical signal level and input to the readout circuit 308B.

Then, in the readout circuit 308B, a voltage resulted after an inversion gain has been applied to a voltage change at a capacitance ratio of the clamp capacitor C0 and the feedback capacitor Cf is output from the operational amplifier 406.

Subsequently, at time t20, the signal PTSB output from the timing generator 189 to the readout circuit 308B transitions from a low level to a high level to turn on the switch 414 and write the output at this time of the operational amplifier 406 to the capacitor CTSB.

Subsequently, at time t21, the signal PTSB output from the timing generator 189 to the readout circuit 308B transitions from a high level to a low level to turn off the switch 414 and complete writing to the capacitor CTSB.

Subsequently, at time t22, the vertical scanning circuit 307 causes the reset pulse ϕRES1B to transition from a low level to a high level to turn on the reset transistor 314B. Thereby, the floating diffusion region 313B is connected to the power source line 305 via the reset transistor 314B to enter a reset state.

Figure 13:
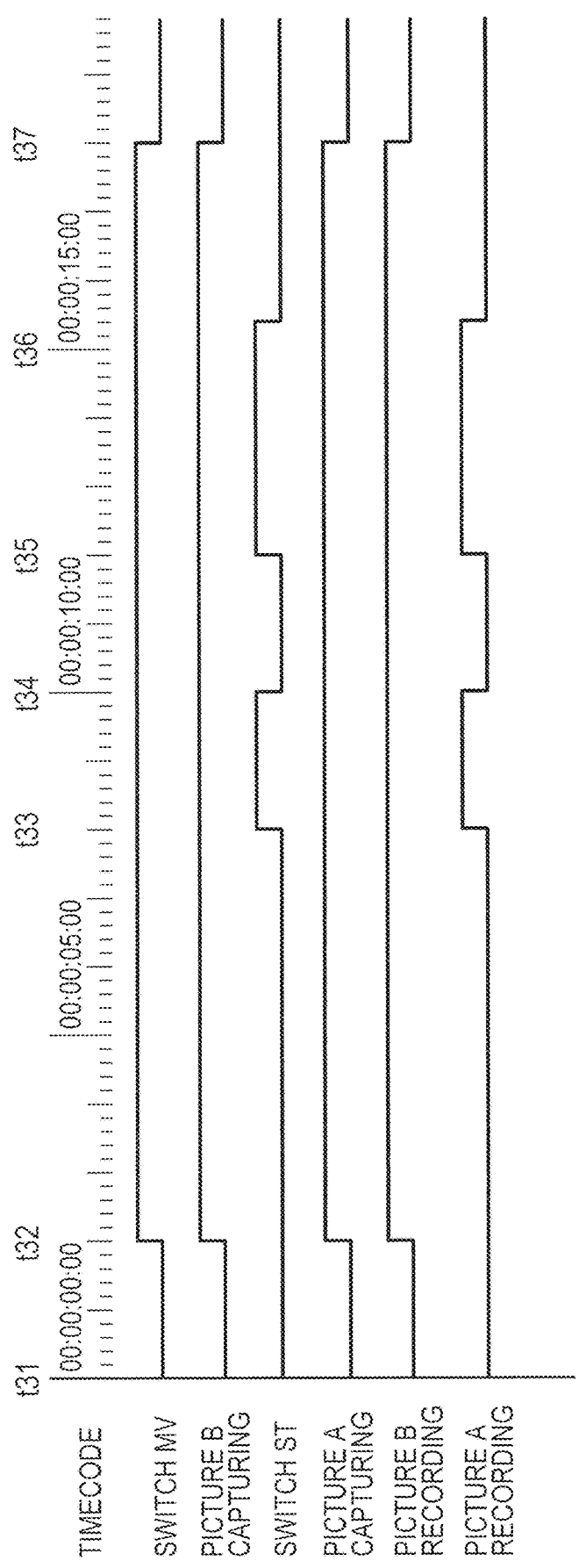
FIG. 13 is a timing chart illustrating a capturing sequence in the imaging device according to the first embodiment of the present invention.

FIG. 13 is a timing chart for illustrating a capturing sequence in the imaging device according to the present embodiment. The uppermost "timecode" in FIG. 13 represents elapsed time from a power activation, in which "00:00:00:00" represents "hours:minutes:seconds:frames".

Time t31 is time of the power activation of the imaging device 100. At time t32, the switch MV 155 that is a motion image capturing button is operated by a user and turned on. In response, a capturing of a picture B and a capturing of a picture A are started. In response to the switch MV 155 that is a motion image capturing button being operated, image data of the picture B is recorded to the storage medium 193 after predetermined signal processing.

During a period from time t33 to time t34 and a period from time 35 to time t36, the switch ST 154 that is used for capturing of a static image is operated. In response, in these periods, image data of the picture A is also recorded to the storage medium 193 after predetermined signal processing. Note that image data of the picture A may be recorded to the storage medium 193 not only during the period from time t33 to time t34 and the period from time 35 to time t36 but also during the same period as for image data of the picture B.

Figure 14:
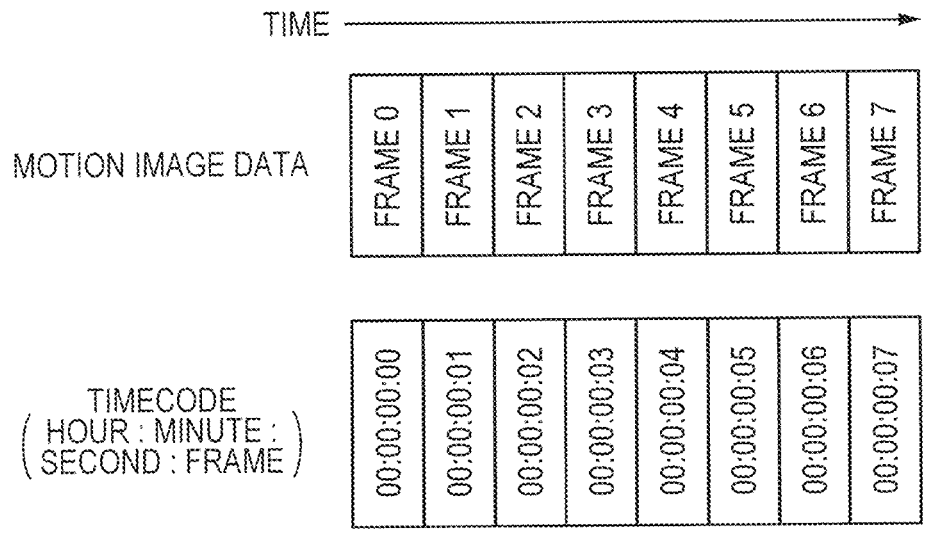
FIG. 14 is a diagram illustrating an example of timecode added to each frame of capturing data of a motion image and a static image.

For both the picture A and the picture B, each image data stored in the storage medium 193 is a motion image of the same framerate, for example, 60 fps and a timecode in the NTSC system is added. Values of the timecodes added to each frame of a motion image data will be those illustrated in FIG. 14, for example.

Figure 15:
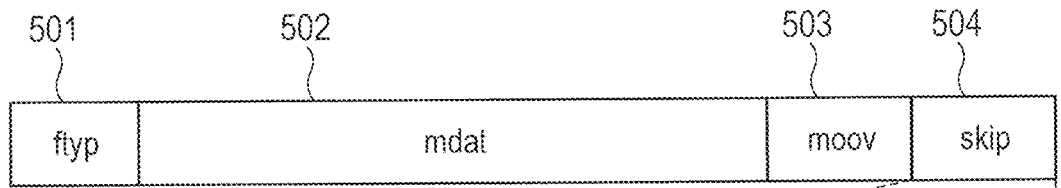
FIG. 15 is a diagram illustrating an example of file structure of capturing data of a motion image and a static image.

FIG. 15 is a diagram illustrating an example of file structure of image data of the picture A and the picture B. Although an MP4 file is exemplified here as a format of image data, the format of image data is not limited thereto. The MP4 file format is standardized in ISO/IEC 14496-1/AMD6. All pieces of information are stored in a structure called Box and composed of multiplexed video and audio bit streams (media data) and management information for the media data (metadata). Each Box has a four-character identifier representing each Box type. A file type Box 501 (ftyp) is located in the top of a file and represents a Box for identifying a file. In a media data Box 502 (mdat), multiplexed video and audio bit streams are stored. In a movie Box 503 (moov), management information for reproducing bit streams stored in the media data Box 502 is stored. A skip Box 504 (skip) is a Box for skipping over data stored within the skip Box 504 at reproduction.

In the skip Box 504, a clip name 508 of a clip including the image data file and a Unique Material Identifier (UMID) 509 (CLIP-UMID) of the clip provided to the material are stored. In the skip Box 504, a timecode value of a clips top frame (timecode top value) 510 and a serial number 511 of storage media storing the material file are stored. Note that, in FIG. 15, the skip Box 504 further includes a free space 505, user data 506, and metadata 507. Since special data such as the UMID of the material file and a serial number of a storage media is stored in the skip Box 504, such special data does not affect reproduction by a general viewer.

The same CLIP-UMID is set for respective MP4 files of the picture A and the picture B. This allows for using the CLIP-UMID to search a file of the same CLIP-UMID from a single material file and performing an automatic associating operation without involving a check operation by a human.

Figure 16:
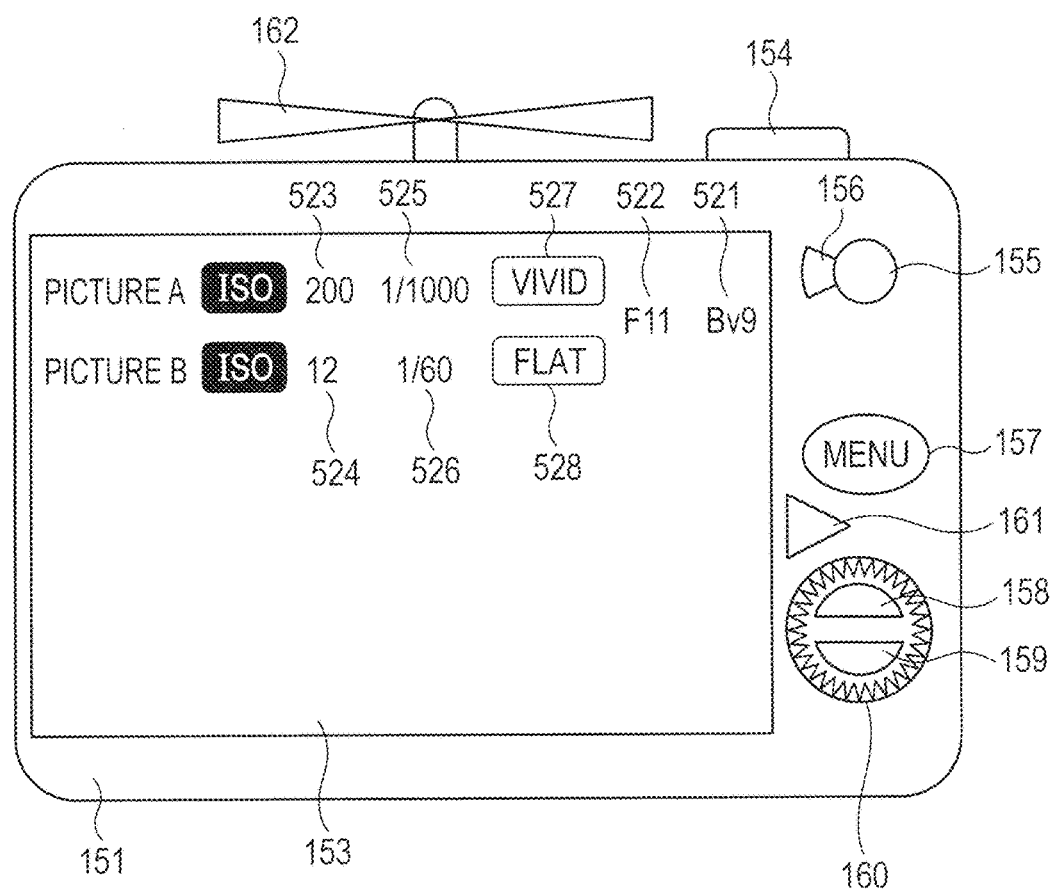
FIG. 16 is a diagram illustrating a setting window of capturing conditions of a motion image and a static image.

FIG. 16 is a diagram illustrating a setting window of capturing conditions of the picture A and the picture B. For example, with a rotation of the capturing mode selection lever 156 by 90 degrees in the clockwise direction from a position illustrated in FIG. 1B, a dual image mode that enables simultaneous capturing of two images is entered. On the display unit 153, displayed are a By value 521 in accordance with the current brightness of an object, an F number 522, respective ISO sensitivities 523 and 524 of the picture A and the picture B, and shutter speeds 525 and 526. Further, picture modes 527 and 528 that are currently set for the picture A and the picture B are displayed, respectively. A picture mode suitable for the intended capturing can be selected from multiple choices by using the up/down switches 158 and 159 and the dial 160.

Figure 17:
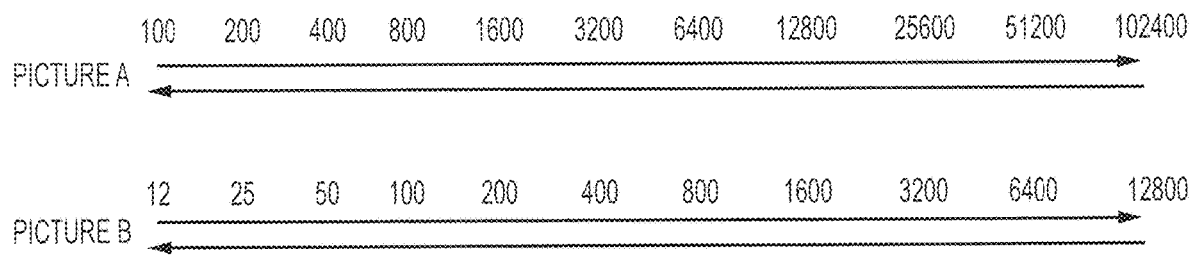
FIG. 17 is a diagram illustrating an example of ISO sensitivity ranges of image signals captured by using two photodiodes having different light-receiving efficiencies.

As described above, a difference of the light-receiving efficiency between the photodiode 310A and the photodiode 310B is set to three steps. Thus, there is a three-step difference in the ISO sensitivity between the picture A and the picture B. As illustrated in FIG. 17, the picture A ranges from ISO 100 to ISO 102400 and the picture B ranges from ISO 12 to ISO 12800.

Figure 18:
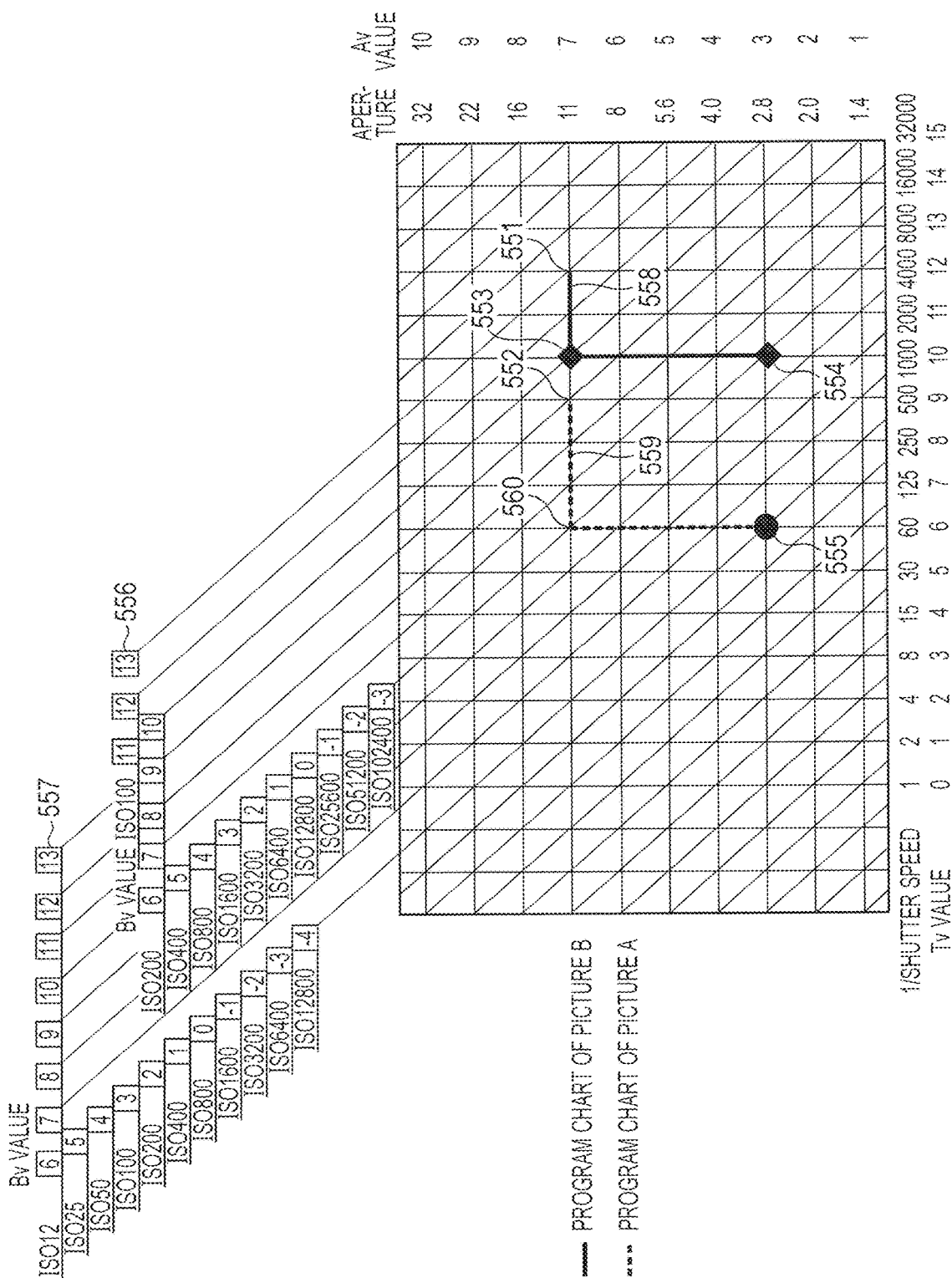
FIG. 18 is a program AE chart in a dual-image mode of the imaging device according to the first embodiment of the present invention.

FIG. 18 is a program Automatic Exposure (AE) chart in the dual image mode. The horizontal axis represents a Tv value and a corresponding shutter speed, and the vertical axis represents an Av value and a corresponding aperture value. Further, the angle direction represents equal By lines. The relationship between the By value and the ISO sensitivity of the picture A is indicated in a gain indication area 556, and the relationship between the By value and the ISO sensitivity of the picture B is indicated in a gain indication area 557. Note that, in FIG. 18, each By value is indicated by a number enclosed with a square in order to distinguish it from other parameters.

How the shutter speed, the aperture value, and the ISO sensitivity change with respect to a change of the brightness from high to low will be described by using FIG. 18.

First, when the By is 13, for the picture A, the ISO sensitivity is set to ISO 100. The equal By line of the picture A intersects at a point 551 with a program chart 558 of the picture A and, based on the point 551, the shutter speed is determined to be 1/4000 and the aperture value is determined to be F11. On the other hand, for the picture B, the ISO sensitivity is set to ISO 12. The equal By line of the picture B intersects at a point 552 with a program chart 559 of the picture B and, based on the point 552, the shutter speed is determined to be 1/500 and the aperture value is determined to be F11.

When the By is 10, for the picture A, the ISO sensitivity is increased by one step and set to ISO 200. The equal By line of the picture A intersects at a point 553 with a program chart 558 of the picture A and, based on the point 553, the shutter speed is determined to be 1/1000 and the aperture value is determined to be F11. On the other hand, for the picture B, the ISO sensitivity is set to ISO 12. The equal By line of the picture B intersects at a point 560 with a program chart 559 of the picture B and, based on the point 560, the shutter speed is determined to be 1/60 and the aperture value is determined to be F11.

When the By is 6, for the picture A, the ISO sensitivity is set to ISO 200. The equal By line of the picture A intersects at a point 554 with a program chart 558 of the picture A and, based on the point 554, the shutter speed is determined to be 1/1000 and the aperture value is determined to be F2.8. On the other hand, for the picture B, the ISO sensitivity is set to ISO 12. The equal By line of the picture B intersects at a point 555 with a program chart 559 of the picture B and, based on the point 555, the shutter speed is determined to be 1/60 and the aperture value is determined to be F2.8.

When the By is 5, for the picture A, the ISO sensitivity is increased by one step and set to ISO 400. The equal By line of the picture A intersects at a point 554 with a program chart 558 of the picture A and, based on the point 554, the shutter speed is determined to be 1/1000 and the aperture value is determined to be F2.8. On the other hand, for the picture B, the ISO sensitivity is set to ISO 25. The equal By line of the picture B intersects at the point 555 with a program chart 559 of the picture B and, based on the point 555, the shutter speed is determined to be 1/60 and the aperture value is determined to be F2.8.

In the same manner, for both the picture A and the picture B, as the brightness decreases, the ISO sensitivity increases while the shutter speed and the aperture value are maintained.

With this exposure operation illustrated in the program AE chart, the picture A maintains a shutter speed of 1/1000 or faster in the entire represented brightness range, and the picture B maintains a shutter speed of 1/60 in most brightness range. This allows the picture B to be a high quality motion image without jerkiness like a frame-by-frame video while providing a stop motion effect in the picture A.

Figure 19:
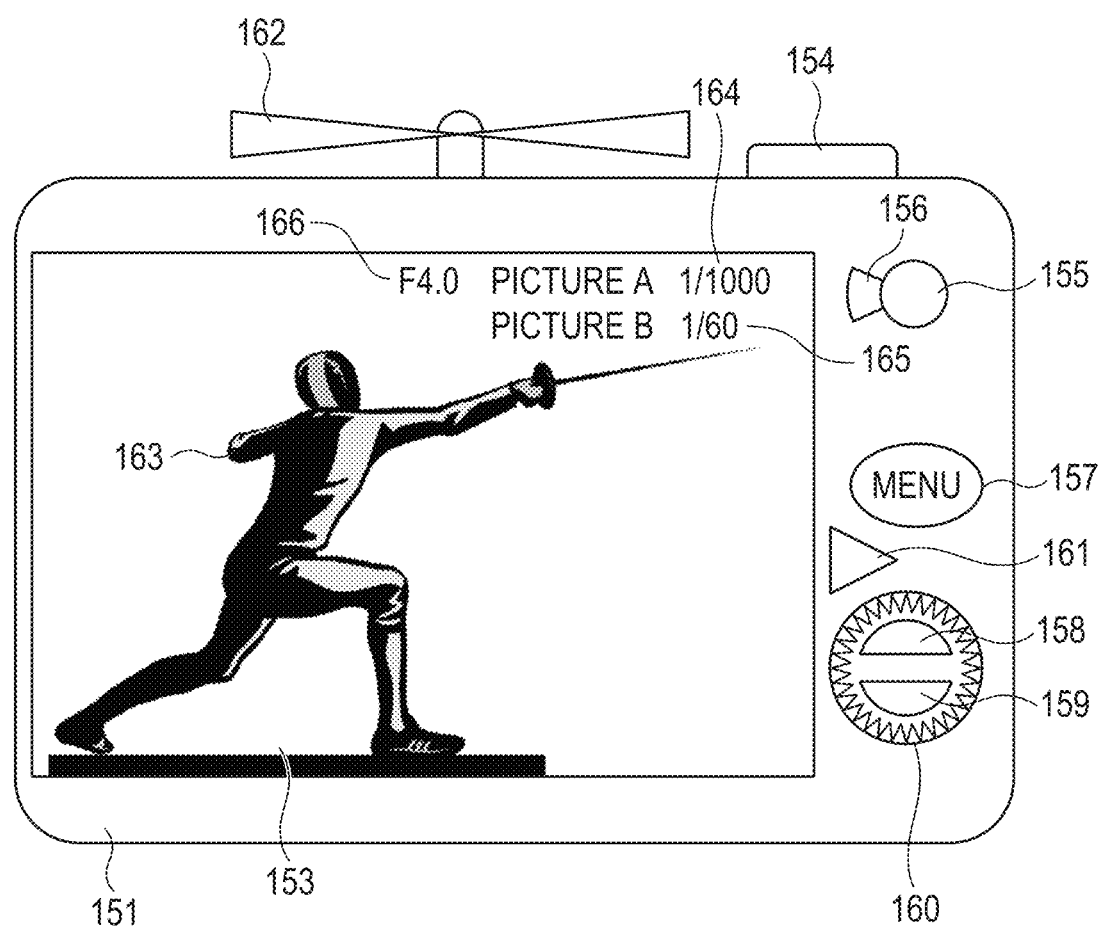
FIG. 19 is a diagram illustrating a view of a display unit during a live view display after powering the imaging device.

FIG. 19 is a diagram illustrating a view of the display unit 153 during a live view display after the imaging device is powered on. A sports scene including a person 163 captured through the imaging optics 152 is displayed on the display unit 153. In FIG. 19, the capturing mode selection lever 156 is positioned in a dual image mode where it has been revolved by 90 degrees in the clockwise direction from a state of FIG. 1B. Thus, an accumulation period 164 of the picture A, an accumulation period 165 of the picture B, and an F number 166 are displayed on the display unit 153.

FIG. 20 is a diagram illustrating accumulation and transfer timings when a capturing is performed by the imaging device according to the first embodiment such that accumulation periods have a matched intermediate time. FIG. 20 illustrates a V synchronous signal 681. Further, FIG. illustrates accumulation periods 682 and 683 of the picture A and accumulation periods 686 and 687 of the picture B that are one of the technical features of the present invention. The horizontal axis of FIG. 20 represents time, and frame numbers are indicated above the accumulation periods of the picture A and the picture B.

The accumulation period 682 from time t52 to time t54 is an accumulation period of the uppermost line of a screen of the picture A, and the accumulation period 683 from time t57 to time t59 is an accumulation period of the lowermost line of the screen of the picture A. Further, a transfer period 684 indicated by a dotted line immediately after the accumulation period 682 represents a period of reading out the picture A from the floating diffusion region 313A of the pixel 303 on the uppermost line of the screen. Further, a transfer period 688 indicated by a dotted line immediately after the accumulation period 686 represents a period of reading out the picture B from the floating diffusion region 313B of the pixel 303 on the uppermost line of the screen.

Since the imaging element 184 performs an exposure operation in a rolling electronic shutter system, accumulation periods of the picture A sequentially start from the uppermost line of the screen to the lowermost line of the screen at a predetermined time interval and sequentially end at the time interval. Upon the completion of accumulation periods, signal charges are sequentially read out from the imaging element 184 and input to the analog frontend 185.

In a similar manner, the accumulation period 686 from time t51 to time t56 is an accumulation period of the uppermost line of a screen of the picture B, and the accumulation period 687 from time t55 to time t60 is an accumulation period of the lowermost line of the screen of the picture B. Since the photodiode 310A has a higher sensitivity than that of the photodiode 310B, the accumulation period of the picture A is set shorter than the accumulation period of the picture B. In a similar manner to the accumulation periods of the picture A, accumulation periods of the picture B sequentially start from the uppermost line of the screen to the lowermost line of the screen at a predetermined time interval and sequentially end at the time interval. Upon the completion of the accumulation periods, signal charges are sequentially read out from the imaging element 184 and input to the analog frontend 186.

Thus, a shorter accumulation period is set for the picture A performed by the photodiode 310A having a higher light receiving efficiency and a longer accumulation period is set for the picture B performed by the photodiode 310B having a lower light receiving efficiency, and thereby image signals with substantially the same intensity level can be obtained. Therefore, images having a good S/N ratio and causing no feeling of noise can be obtained without increasing gains for the picture A and the picture B.

Further, the intermediate time 685 represented with a thin solid line in FIG. 20 is a line connecting the intermediate times of the accumulation periods 682, 683, and the like for the picture A represented with a thick solid line. Similarly, the intermediate time 689 represented with a thin solid line is a line connecting the intermediate times of the accumulation periods 686, 687, and the like for the picture B represented with a thick solid line. The intermediate time t53 of the accumulation period 682 of the uppermost line of the screen of the picture A matches the intermediate time t53 of the accumulation period 686 of the uppermost line of the screen of the picture B. Similarly, the intermediate times of the accumulation periods of other lines of the picture A match the intermediate times of the accumulation periods of the corresponding lines of the picture B. In such a way, in the present embodiment, the starting timing and the ending timing of the accumulation periods for the picture A and the picture B are controlled such that the accumulation periods of respective lines have the matched intermediate time.

Figure 21A:
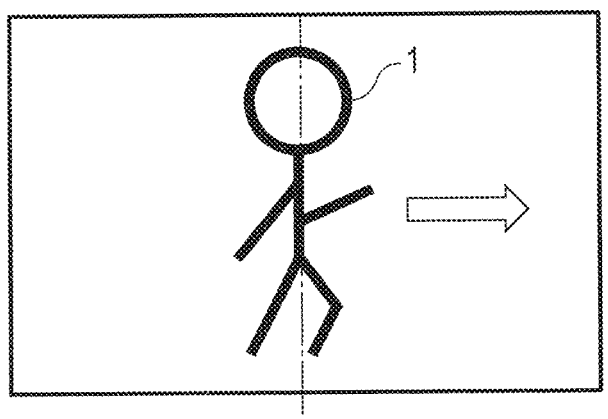
FIG. 21A, FIG. 21B and FIG. 21C are diagrams illustrating an example of images of a picture A and a picture B captured by the imaging device according to the first embodiment such that accumulation periods have a matched intermediate time.
Figure 21B:
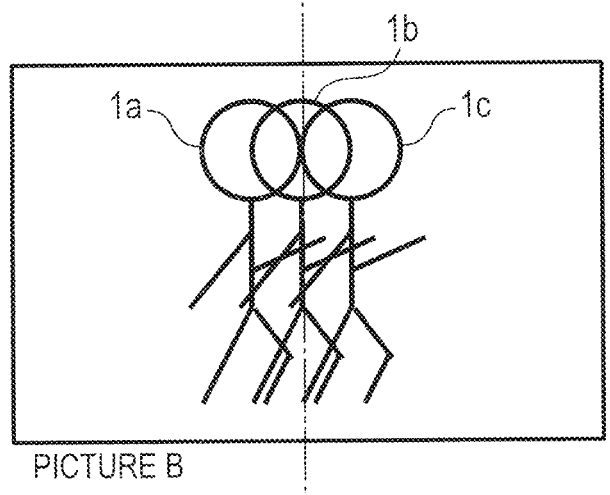
Figure 21C:
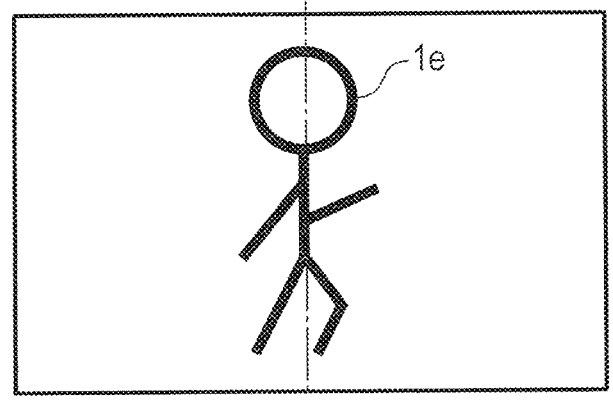

FIG. 21A to FIG. 21C are diagrams illustrating an example of images of the picture A and the picture B captured by the imaging device according to the first embodiment such that accumulation periods have the matched intermediate time. FIG. 21A illustrates an object 1 to be captured.

The object 1 is moving in the direction of the arrow as illustrated in FIG. 21A, which causes an object blur to occur in the picture B having longer accumulation periods. On the other hand, substantially no object blur occurs in the picture A having shorter accumulation periods. FIG. 21B illustrates an image of the picture B with an object blur occurring, and FIG. 21C illustrates an image of the picture A without an object blur.

FIG. 21B schematically illustrates an object blur of the object 1 with object images 1a to 1c. The object images 1a to 1c represents images of the object 1 at the starting time, the intermediate time, and the ending time of an accumulation period of the picture B, respectively. Further, the object images 1a to 1c of FIG. 21B are depicted with lines thinner than that of the object 1e of FIG. 21C to indicate that the light receiving efficiency of the photodiode thereof is lower.

Since the images illustrated in FIG. 21B and FIG. 21C are captured such that the accumulation periods have the matched intermediate time, the position on the image of the object image 1b at the center of the object blur in the picture B matches the position on the image of the object 1e in the picture A. Thus, one of the picture A and the picture B can be used to correct the other. Further, even when a part of frame images of a video generated by using either one of the picture A and the picture B is replaced with frame images generated by using the other, motion of the object during reproduction is smooth and this allows for reproduction of a high quality video. Specific reproduction method and image processing method will be described later.

Figure 22A:
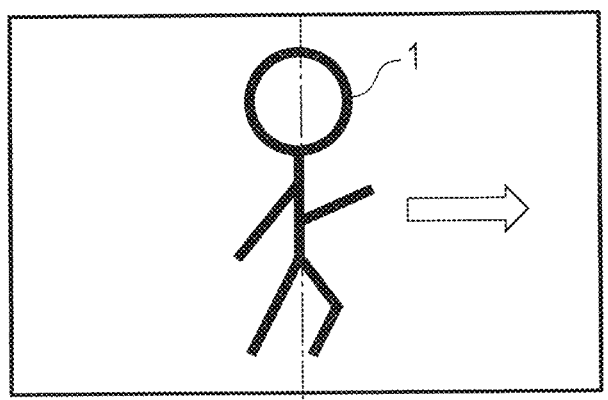
FIG. 22A, FIG. 22B and FIG. 22C are diagrams illustrating an example of images of a picture A and a picture B captured by the conventional imaging device such that accumulation periods have a matched ending time.
Figure 22B:
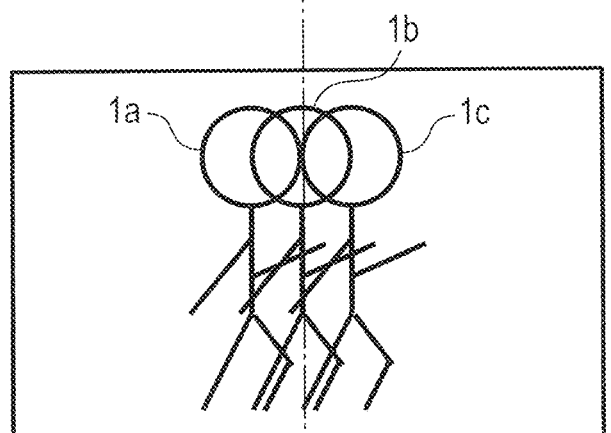
Figure 22C:
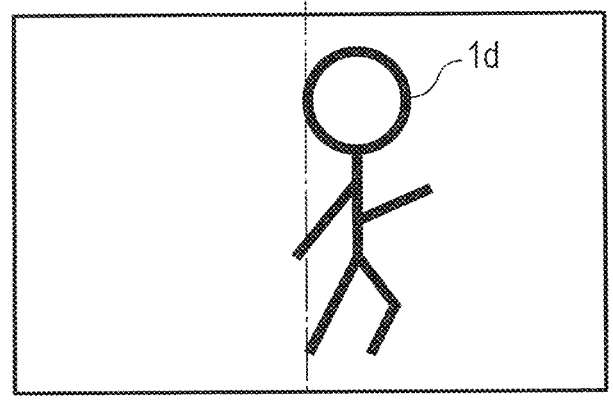

FIG. 22A to FIG. 22C are diagrams illustrating an example of images of the picture A and the picture B captured by the conventional imaging device such that accumulation periods have the matched ending time. FIG. 22A illustrates the object 1 that is moving in the direction of the arrow. FIG. 22B illustrates an image of the picture B with an object blur occurring in a similar manner to FIG. 21B. FIG. 22C illustrates an image of the picture A without an object blur in a similar manner to FIG. 21C.

The images illustrated in FIG. 22B and FIG. 22C are captured such that accumulation periods have the matched ending time. Thus, unlike FIG. 21B and FIG. 21C, the position on the image of the object 1d in the picture A matches that of the object image 1c at the end of the object blur in the picture B rather than the object image 1b at the center of the object blur in the picture B. Therefore, even if trying to use one of the picture A and the picture B to correct the other, proper correction cannot be made because the positions on the images of the object are different. Further, with a part of frame images of a video generated by using one of the picture A and the picture B being replaced with frame images generated by using the other, a motion of the object during reproduction of the video would appear to be unnatural as if there were missing frames.

On the other hand, in the present embodiment, since the picture A and the picture B are captured such that the accumulation periods have the matched intermediate time, images generated by using the picture A and the picture B can be reproduced at a high quality as illustrated in FIG. 21A to FIG. 21C.

Figure 23:
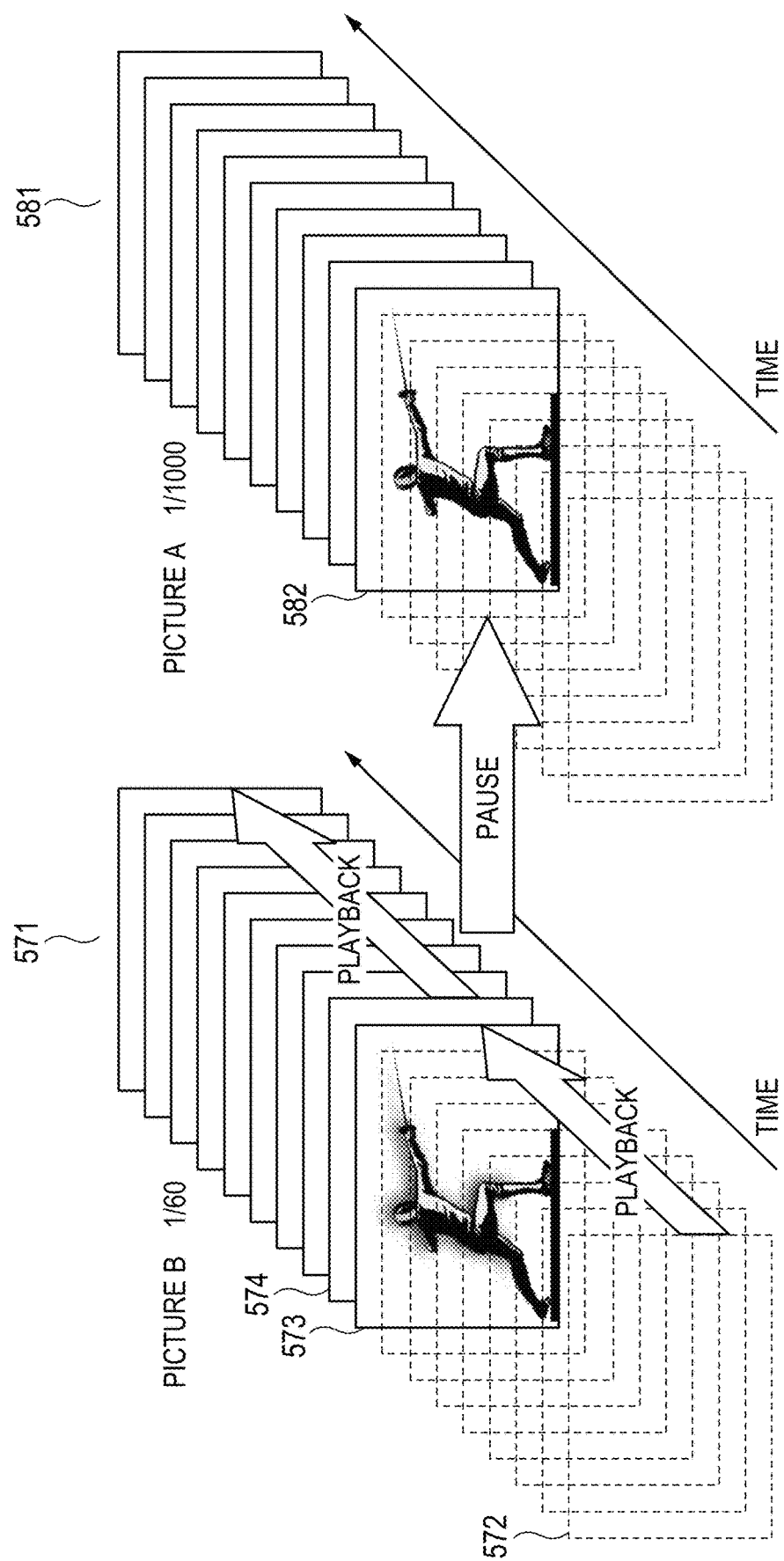

FIG. 23 is a diagram illustrating an example use of the picture A and the picture B stored in a storage in a tablet terminal, a personal computer, a television monitor, or the like. Data files of the picture A and the picture B are stored in a storage or the like on a network. In FIG. 23, a frame group 581 is a frame group of the picture A stored in an MP4 file, and a frame group 571 is a frame group of the picture B stored in another MP4 file. The same CLIP-UMID is set in these MP4 files at the capturing time and associated with each other.

First, upon the start of reproduction of a motion image, frames are sequentially reproduced at a defined framerate from a top frame 572 of the frame group 571 of the picture B. Since the picture B is captured at a setting such that the shutter speed does not become excessively fast (in this example, 1/60 seconds), a reproduced video is of a high quality without jerkiness like a frame-by-frame video. In FIG. 23, a circumference of an object in the frame 573 is shaded off to express a motion of the object to a degree not causing jerkiness.

In response to a user making a pause operation at the time when the reproduction reaches the frame 573, the frame 582 having the same timecode is automatically searched from the data file of the picture A corresponding to the picture B and displayed. The picture A has been captured at a fast shutter speed (1/1000 seconds in this example) by which a stop motion effect is likely to be obtained, and is a powerful image that captures a moment of a sports scene. While two images of the picture A and the picture B are captured with different accumulation time settings, almost the same level of signal charges are obtained by the imaging element 184 without an increase of the gain for the picture A. Therefore, images having a good S/N ratio and causing less feeling of noise are obtained for both the picture A and the picture B.

Here, upon an instruction of printing, data of the frame 582 of the picture A is output to the printer 195 via the print interface unit 194. Therefore, a print also provides a powerful feeling with a stop motion effect that reflects the picture A. In response to the user releasing the pause, the frame group 571 of the picture B is automatically used again and reproduction is resumed from the frame 574. At this time, a played back video is of a high quality without jerkiness like a frame-by-frame video.

In such a way, an image suitable for a motion image without jerkiness can be obtained by using the picture B as an image signal for a motion image. Further, an image suitable for a static image and a print with a stop motion effect can be obtained by using the picture A as an image signal for a static image. In the imaging device of the present embodiment, these two effects can be implemented by using a single imaging element.

Further, in the present embodiment, a file for a static image and a file for a motion image are separated and filed in different folders in the storage medium 193 in order to improve operatability at a playback. For example, as described above, both the picture A and the picture B are stored separately in a folder for motion images and a folder for static images with the same framerate and the same MP4 format. Then, in response to an operation of the playback button 161, the picture B stored as file data for a motion image is continuously played back as a motion image. Further, the picture A stored as file data for a static image is played back as a static image one by one in response to an image advance operation.

With respect to a display of a static image during a playback of a motion image, a static image picture A of the same timecode as that of the motion image picture B during playback may be displayed at the timing when the switch ST 154 is operated. Further, a static image before or after the up/down switch 158 or 159 is operated may be displayed. A combination of "picture A" and "picture B" used for a motion image capturing and a static image capturing is determined at the capturing. Each of the captured "picture A" and "picture B" is then filed in a folder for motion images or a folder for static images.

Here, an example use of displaying a static image during a pause of a motion image illustrated in FIG. 23 will be described by using previous FIG. 22B and FIG. 22C for the case of a use of the picture A and the picture B which are captured such that accumulation periods have the matched ending time. In response to a pause of reproduction of the image of the picture B of FIG. 22B as a motion image, the image of the picture A of FIG. 22C is displayed as a corresponding frame. As illustrated in FIG. 22C, however, the object 1d in the picture A is displayed at a different position from the object image 1b for the center of the object blur in the picture B.

In particular, when trying to making a pause for a desired image that captures a moment during reproduction of a video of a sports scene or the like, such a displacement of the image is not intended by the user, which may significantly reduce the value of the image. Therefore, in the present embodiment, as illustrated in FIG. 20, the starting timings and the ending timings of accumulation periods of the picture A and the picture B are controlled such that the accumulation periods have the matched intermediate time. This allows for high quality reproduction of images without a displacement, generated by using the picture A and the picture B, also in the example use of displaying a static image during a pause of a motion image as illustrated in FIG. 23.

Next, consideration will be made for the case where, when so-called blown-out highlights (overexposure) or the like occur in either one of the picture A and the picture B, one image signal in which an image noise is occurring is corrected by using another image signal in which no image noise is occurring. For example, this may be a case where a flash light occurs at a timing that is out of the accumulation period of the picture A but is within the accumulation period of the picture B. In such a case, since the dynamic range of the picture B is exceeded causing blown-out highlights, it appears to be effective to replace the frame image of the picture B with the frame image of the picture A. However, when the difference between the frame image of the picture A and the frame image of the picture B is large, the following problem may be caused.

Figure 24A:
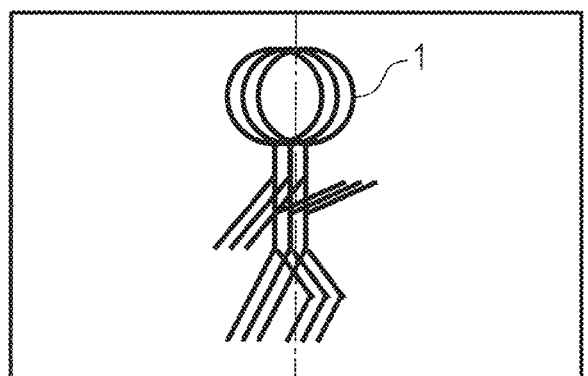
FIG. 24A, FIG. 24B, FIG. 24C and FIG. 24D are diagrams illustrating an example when a frame of images of a captured video is replaced by using the conventional imaging device such that accumulation periods have a matched ending time.
Figure 24B:
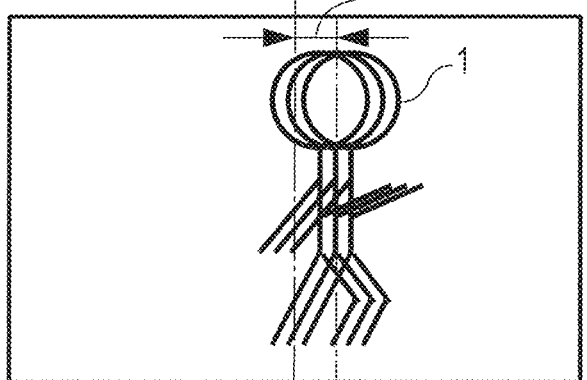
Figure 24C:
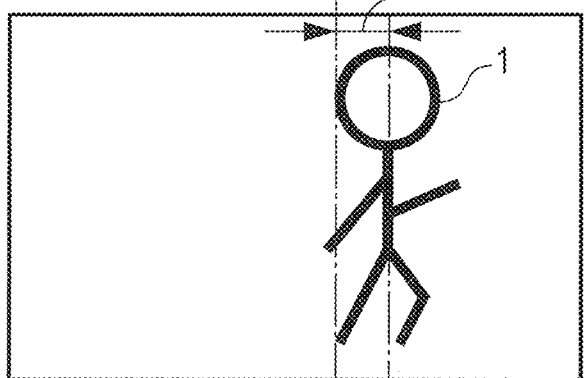
Figure 24D:
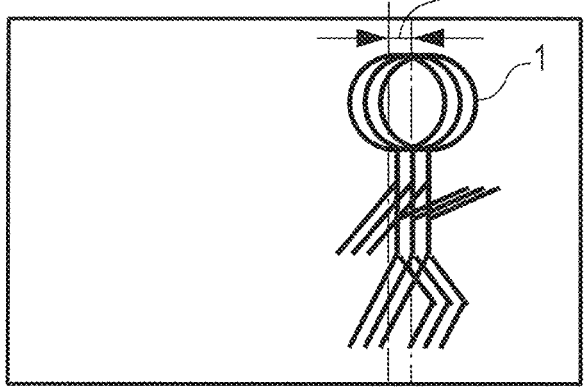

FIG. 24A to FIG. 24D are diagrams illustrating an example of a case of replacement of one frame image of a video captured by the conventional imaging device such that accumulation periods have the matched ending time. FIG. 24A to FIG. 24D illustrate four frame images of a video in which a moving object 1 is captured such that the accumulation periods have the matched ending time. The images illustrated in FIG. 24A, FIG. 24B, and FIG. 24D are images from the picture B. On the other hand, the image illustrated in FIG. 24C is replaced with the corresponding image of the picture A, because blown-out highlights occur at a capturing timing of the picture B in interest.

Consideration will be made for a case of reproducing such a series of frame images. Each dashed line illustrated in FIG. 24A to FIG. 24D illustrates the centroid of the image of the object 1, and each of the motion amounts 10a to 10c represents the motion amount of the centroid of the object 1 between respective frame images. In FIG. 24A to FIG. 24D, the motion amounts have a relationship of 10b>10a>10c. In the image captured with the same ending time of the accumulation periods between the picture A and the picture B, the difference between corresponding frame images is large, as illustrated in FIG. 22A to FIG. 22C, and thus the motion amount of the centroid of the object 1 will be different between frame images. Reproducing such images results in an unnatural motion of the object 1 as if there were missing frames.

FIG. 25A to FIG. 25D are diagrams of an example of a case of replacing one frame image of a video captured by the imaging device according to the first embodiment such that accumulation periods have the matched intermediate time.

Figure 25A:
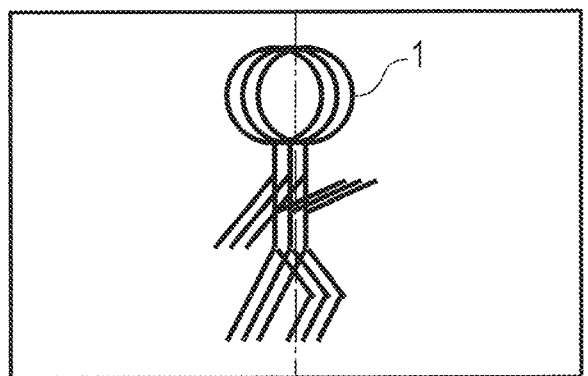
FIG. 25A, FIG. 25B, FIG. 25C and FIG. 25D are diagrams illustrating an example when a frame of images of a captured video is replaced by using the imaging device according to the first embodiment such that accumulation periods have a matched intermediate time.
Figure 25B:
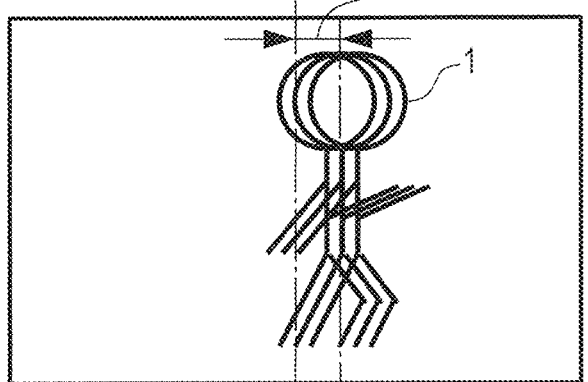
Figure 25C:
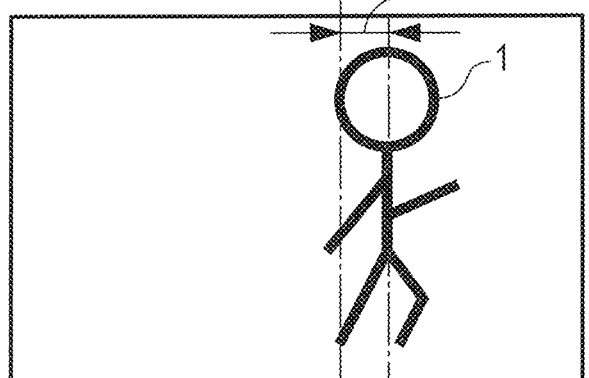
Figure 25D:
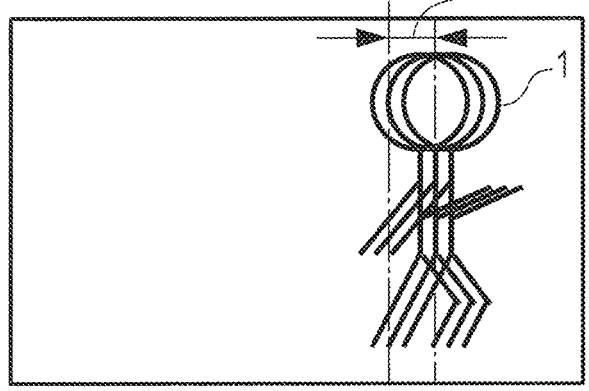

In a similar manner to FIG. 24A to FIG. 24D, the images illustrated in FIG. 25A, FIG. 25B, and FIG. 25D are images from the picture B, and the image illustrated in FIG. 25C is an image from the picture A.

Consideration will be made for a case of reproducing such a series of frame images. In a similar manner to FIG. 24A to FIG. 24D, each dashed line illustrated in FIG. 25A to FIG. 25D illustrates the centroid of the image of the object 1, and each of the motion amounts 11a to 11c represents the motion amount of the centroid of the object 1 between respective frame images. In FIG. 25A to FIG. 25D, the motion amounts have a relationship of $10a=10b=10c$. Thereby, the motion of the object 1 appears smooth in reproducing images illustrated in FIG. 25A to FIG. 25D, which allows for reproduction of a video at a high quality in accordance with a user's intention.

Note that, although the case of replacement of a frame image with blown-out highlights (overexposed) in FIG. 24A to FIG. 24D and FIG. 25A to FIG. 25D, the same effects and advantages can be obtained also for the case of replacement of a frame image with blocked up shadows (underexposed) or other image noises occurring.

Next, it will be described that it is effective to capture the picture A and the picture B such that accumulation periods have the matched intermediate time also in a case where crosstalk occurs between the picture A and the picture B. In the imaging device in which a single imaging element has two photodiodes 310A and 310B as discussed in the present embodiment, crosstalk may occur, which is caused by signal charges generated by photoelectric conversion of one of the photodiodes being leaked into the other photodiode.

Figure 26A:
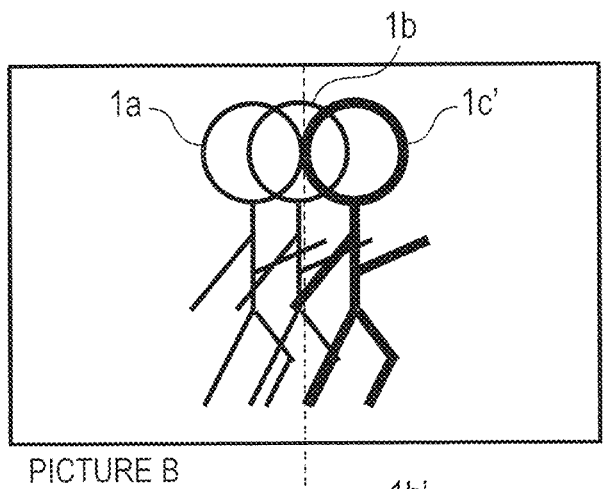
FIG. 26A and FIG. 26B are diagrams illustrating an influence of crosstalk in the imaging device according to the first embodiment.
Figure 26B:
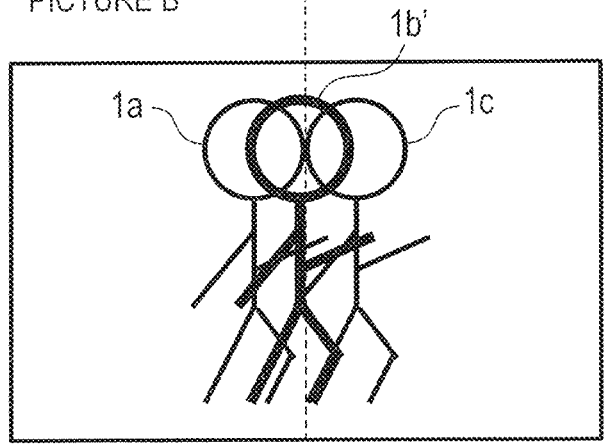

FIG. 26A and FIG. 26B are diagrams illustrating an influence of crosstalk in the imaging device according to the first embodiment. FIG. 26A illustrates an example of an image of the picture B captured by the conventional imaging device such that accumulation periods have the matched ending time. On the other hand, FIG. 26B illustrates an example of an image of the picture B captured by the imaging device of the present embodiment such that accumulation periods have the matched intermediate time.

FIG. 26A illustrates an example of a case where an image of the object 1d of the picture A illustrated in FIG. 22C cross-talks on the image of the picture B illustrated in FIG. 22B. In FIG. 26A, an unevenness due to crosstalk occurs on an object image 1c' at the end of an object blur and thus is notable.

In contrast, FIG. 26B illustrates an example of a case where an image of the object 1e of the picture A illustrated in FIG. 21C cross-talks on the image of the picture B illustrated in FIG. 21B. In FIG. 26B, since an unevenness due to crosstalk occurs in an object image 1b' of the center of an object blur, the influences of the crosstalk overlap with the left object image 1a and the right object image 1c and thus less notable compared to the case of FIG. 26A. In such a way, even when there is an influence of crosstalk between the picture A and the picture B, it is effective to capture them such that accumulation periods have the matched intermediate time.

As described above, the scanning unit (vertical scanning circuit) of the present embodiment drives pixels such that the intermediate time of each accumulation period of the first photoelectric conversion unit (photodiode 310A) matches the intermediate time of each accumulation period of the second photoelectric conversion unit (photodiode 310B). Further, the readout unit (readout circuit) of the present embodiment reads out the first image signal (picture A) from the first photoelectric conversion unit and reads out the second image signal (picture B) from the second photoelectric conversion unit. Further, the generating unit (system control CPU) of the present embodiment generates an image by using the first image signal and the second image signal whose accumulation periods have the matched intermediate time.

This allows for high quality reproduction of images generated by using two image signals having different lengths of accumulation periods output from a single imaging element.

Note that a storage unit (storage interface unit 192) that stores the first image with the picture A and the second image with the picture B associated with each other may be provided, or the first image and the second image associated with each other may be transmitted to the outside of the imaging device. Further, a reproducing unit (display interface unit 191) that associates the first image and the second image with each other for reproduction may be provided, or the first image and the second image associated with each other may be reproduced by a reproducing device outside the imaging device.

Second Embodiment

An imaging device according to a second embodiment will be described below by using FIG. 27. While the case where the framerate is the same for the picture A and the picture B has been described in the first embodiment, a case where the framerate is different between the picture A and the picture B will be described in the present embodiment.

Although a single time of accumulation for the picture A is performed during a single accumulation period for the picture B in the first embodiment, multiple times of accumulation for the picture A can be performed during a single accumulation period for the picture B. In the present embodiment, it will be described that a capturing with matched intermediate time of accumulation periods is effective also in the case where the framerate is different between the picture A and the picture B. In this case, the vertical scanning circuit 307 drives pixels such that the intermediate time of one of the plurality of accumulation periods for the picture A included in the accumulation periods for the picture B matches the intermediate time of the accumulation period for the picture B.

FIG. 27 is a diagram illustrating accumulation and transfer timings when the framerate is different between two image signals caused by the imaging device according to the second embodiment. The timing sequence illustrated in FIG. 27 is different from the timing sequence of the first embodiment illustrated in FIG. 20 in that the framerate of the picture A is different from the framerate of the picture B. Since other features are the same as those in FIG. 20, description thereof will be omitted.

An accumulation period 602 and an accumulation period 603 depicted with thick lines in FIG. 27 are an accumulation period for the uppermost line of a screen and an accumulation period for the lowermost line of the screen of the picture A, respectively. Similarly, an accumulation period 604 and an accumulation period 605 depicted with thick lines in FIG. 27 are an accumulation period for the uppermost line of the screen and an accumulation period for the lowermost line of the screen of the picture B, respectively. In FIG. 27, three times of accumulation periods for the uppermost line of the screen of the picture A are included in the accumulation period 604 for the uppermost line of the screen of the picture B during the time t61 to t63. The same applies to other lines.

Further, the intermediate time t62 of the accumulation period 604 for the picture B matches the intermediate time t62 of the accumulation period 602 for the picture A. Further, the intermediate time t64 of the accumulation period 605 for the picture B matches the intermediate time t64 of the accumulation period 603 for the picture A. The same applies to other lines.

As described above, in the present embodiment, pixels are driven such that the intermediate time of one of the plurality of accumulation periods of the first photoelectric conversion unit included in an accumulation period of the second photoelectric conversion unit matches the intermediate time of the accumulation period of the second photoelectric conversion unit. This allows for the same advantages as those in the first embodiment and, since framerates can be independently set for the picture A and the picture B, slow reproduction at a high framerate can be performed by using the picture A, for example.

Third Embodiment

An imaging device according to the third embodiment will be described below by using FIG. 28 to FIG. 30. In the first embodiment, the configuration in which the readout circuit 308A reads out the picture A and the readout circuit 308B reads out the picture B has been described. In contrast, in the present embodiment, a configuration in which a single shared readout circuit 308 reads out both the picture A and the picture B will be described.

In FIG. 20 of the first embodiment, the transfer period for reading out the picture A or the picture B from the floating diffusion region 313 are represented by dotted lines. In FIG. 20, accumulation and transfer timings are controlled such that accumulation periods have the matched intermediate time and, as a result, the readout timings are different between the picture A and the picture B on the same line. Also in the present embodiment, accumulation and transfer timings are controlled such that accumulation periods have the matched intermediate time in a similar manner to the first embodiment, and therefore the readout timings are different between the picture A and the picture B on the same line as illustrated in FIG. 20. Thus, in the present embodiment, since the readout circuit 308A that reads out the picture A and the readout circuit 308B that reads out the picture B do not operate at the same time, the readout circuits can be shared.

In contrast, when accumulation and transfer timings are controlled such that accumulation periods have the matched ending time as seen in the conventional art, the readout timings of image signals are matched on the corresponding lines for the picture A and the picture B, and therefore the readout circuit cannot be shared.

Figure 28:
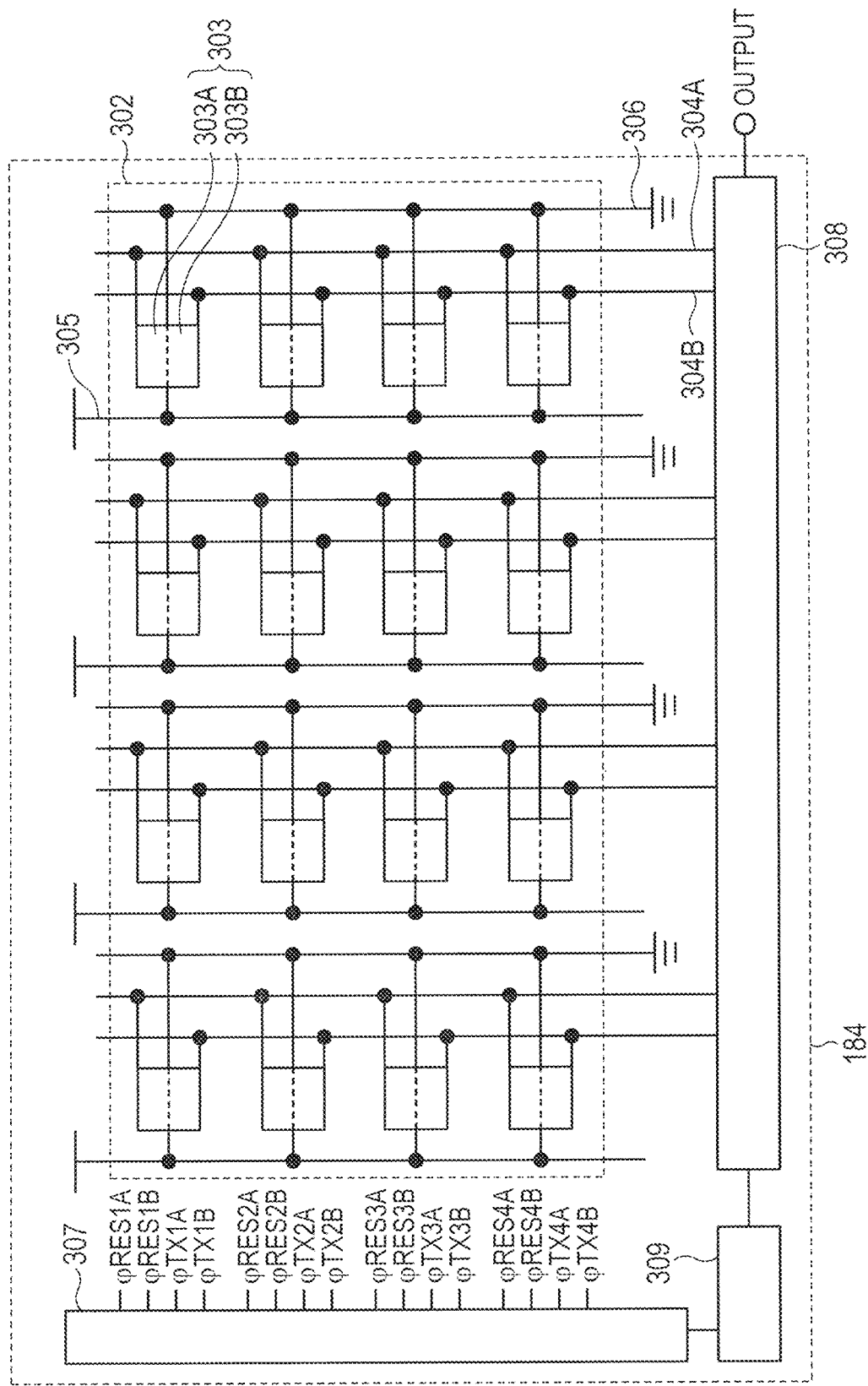
FIG. 28 is a block diagram illustrating a general configuration of an imaging element in an imaging device according to a third embodiment.

FIG. 28 is a block diagram illustrating a general configuration of the imaging element 184 in the imaging device according to the third embodiment. The imaging element 184 illustrated in FIG. 28 is different from the imaging element 184 of the first embodiment illustrated in FIG. 3 in that the readout circuits 308A and 308B are shared in the single readout circuit 308. Further, both the signal output lines 304A and 304B are connected to the shared readout circuit 308. Since other features are the same as those of FIG. 3, description thereof will be omitted.

Figure 29:
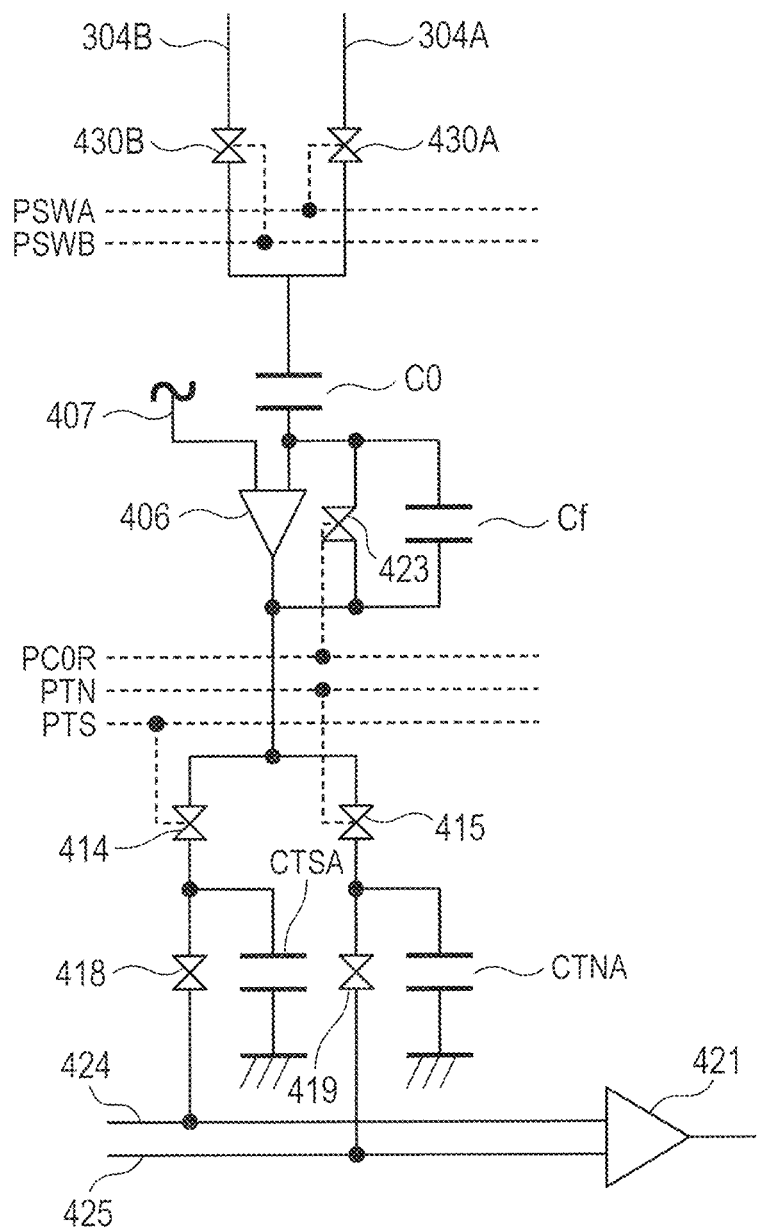
FIG. 29 is a block diagram illustrating a general configuration of a readout circuit in the imaging device according to the third embodiment.

FIG. 29 is a block diagram illustrating a general configuration of the readout circuit 308 in the imaging device according to the third embodiment. The readout circuit 308 illustrated in FIG. 29 is different from the readout circuit 308 of the first embodiment illustrated in FIG. 11 in that input selection switches 430A and 430B are added. Further, the input selection switches 430A and 430B are connected to the signal output lines 304A and 304B, respectively. Since other features are the same as those of FIG. 11, description thereof will be omitted.

As illustrated in FIG. 28, in the present embodiment, both the signal output lines 304A and 304B are connected to the readout circuit 308. Only either one of the input selection switches 430A and 430B is turned on, and thereby the signal output line 304A or 304B is selected and connected to the readout circuit 308. The input selection switches 430A and 430B are controlled by signals PSWA and PSWB, respectively.

Figure 30:
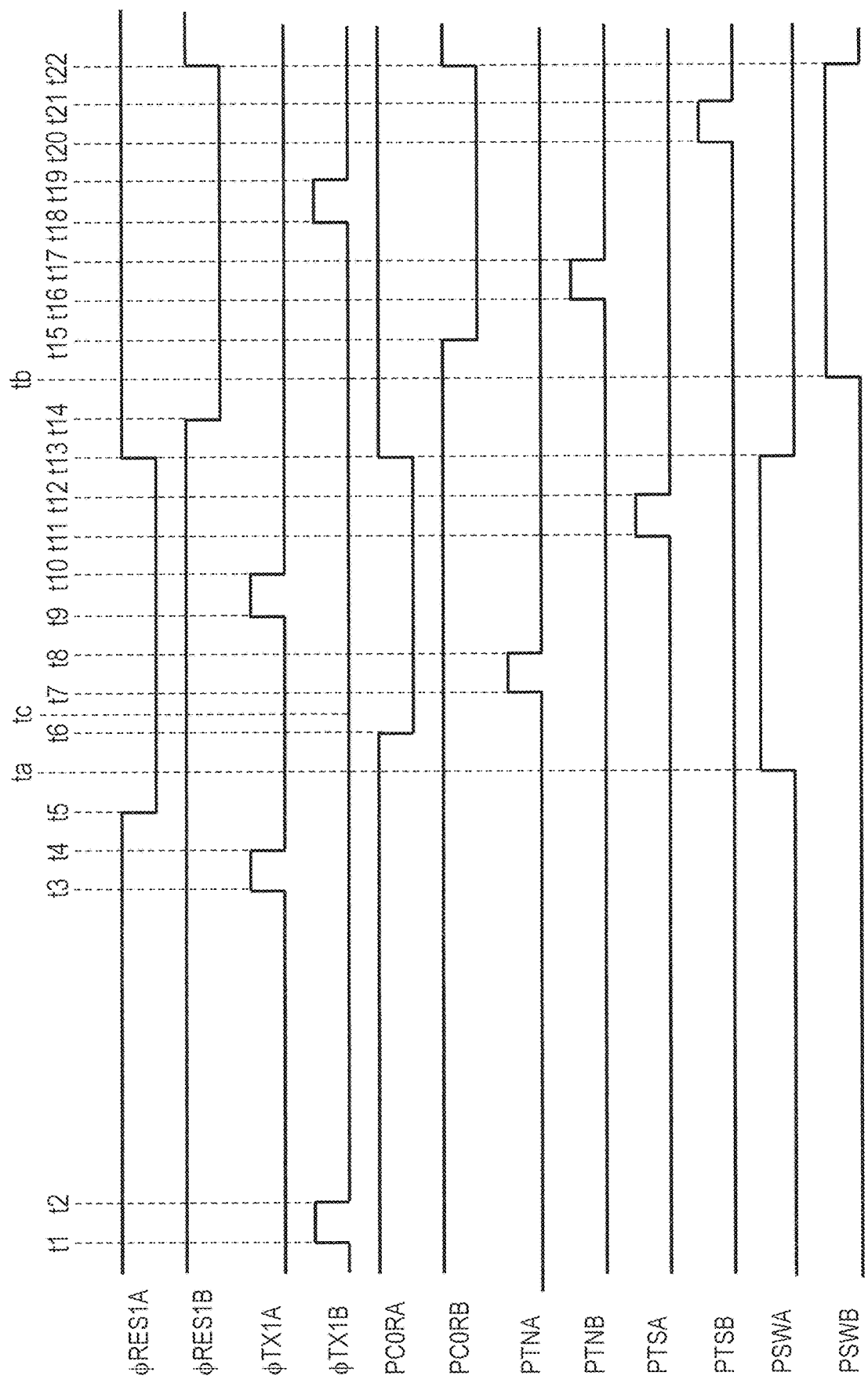
FIG. 30 is a timing chart illustrating a drive sequence of the imaging element in the imaging device according to the third embodiment.

FIG. 30 is a timing chart illustrating a drive sequence of the imaging element 184 in the imaging device according to the third embodiment. The timing chart illustrated in FIG. 30 is different from the timing chart of the first embodiment illustrated in FIG. 12 in that the signals PSWA and PSWB for controlling the input selection switches 430A and 430B are added. Further, time ta is added between the time t5 and the time t6, and time tb is added between the time t14 and the time t15. Since other features are the same as those of FIG. 12, description thereof will be omitted. A control method of the input selection switches 430A and 430B in the imaging device of the present embodiment will be described below by using FIG. 30.

At the time t1, both the signals PSWA and PSWB are in a low level, the input selection switches 430A and 430B are in an off-state, and thus the readout circuit 308 is not connected to any of the signal output lines 304A and 304B.

Figure 12:
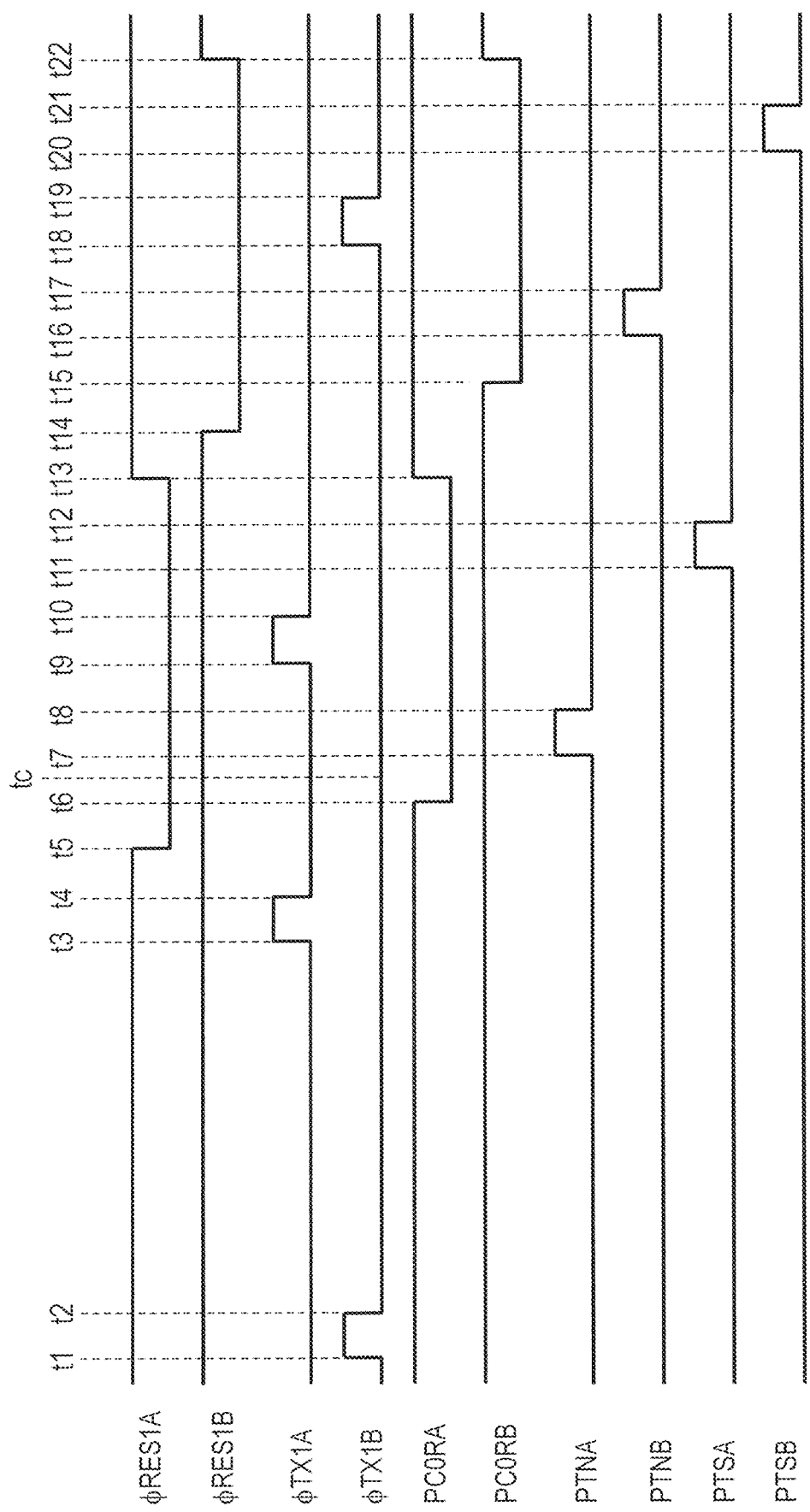
FIG. 12 is a timing chart illustrating a driving sequence of the imaging element in the imaging device according to the first embodiment of the present invention.

From the time t1 to the time t5, the operation is the same as that in FIG. 12 of the first embodiment. At the time ta, the PSWA is turned to a high level and thus the input selection switch 430A is turned on to connect the readout circuit 308 to the signal output line 304A.

From the time t6, at which the signal PC0RA is turned to a low level, to the time t12, the operation is the same as that in FIG. 12 of the first embodiment. At the time t13, the reset pulse φRES1A is turned to a high level, and the signal PC0RA is turned to a high level. The signal PSWA is then turned to a low level to turn off the input selection switch 430A.

At the time t14, the reset pulse φRES1B is turned to a low level to unlatch the reset state of the floating diffusion region 313B. Then, at the time tb, the signal PSWB is turned to a high level and thus the input selection switch 430B is turned on to connect the readout circuit 308 to the signal output line 304B.

From the time t15, at which the signal PC0RB is turned to a low level, to the time t21, the operation is the same as that in FIG. 12 of the first embodiment. At the time t22, the reset pulse φRES1B is turned to a high level, and the signal PC0RB is turned to a high level. The signal PSWB is then turned to a low level to turn off the input selection switch 430B.

As described above, in the present embodiment, the first image signal and the second image signal are read out at different timings by using the same readout circuit. Thereby, the same advantages as those in the first embodiment can be obtained, and the readout circuit can be shared for the picture A and the picture B. That is, a single readout circuit is provided for a pair of pixels of the corresponding picture A and picture B, which allows for a reduction in the circuit size of the readout circuit and therefore a reduction in the size of the imaging device.

Fourth Embodiment

An imaging device according to the fourth embodiment will be described below by using FIG. 31. In the present embodiment, a method of synthesizing a so-called High Dynamic Range (HDR) image with an increased gradation will be described. The configuration of the imaging device of the present embodiment is the same as that of the first embodiment.

In the imaging element 184 according to the present embodiment, the ratio of the light receiving efficiencies of the photodiodes 310A and 310B is around 8:1, that is, the difference of the sensitivity is set around three stops in a similar manner to the first embodiment. In this case, when the same accumulation period is set for both the picture A and the picture B, the picture B is underexposed by three stops with respect to the picture A.

Therefore, when a low brightness region in the picture A can be sufficiently reproduced, although a high brightness region of the picture A is subjected to blown-out highlights in most cases, the brightness information in the picture B can be maintained without blown-out highlights even in a high brightness region thereof. However, since the picture B suffers from blocked-up shadows in a low brightness region, the picture B cannot be used in most cases.

In order to obtain an HDR image, first, the gains of an underexposed image and an overexposed image are properly adjusted, and a synthesizing process is performed by replacing a region of the underexposed image whose brightness is lower than a threshold with a corresponding region of the overexposed image and not replacing a region of the underexposed image whose brightness is higher than the threshold. The picture B can be used as an underexposed image, and the picture A can be used as an overexposed image. However, it is necessary to provide a natural appearance for the user with respect to an intermediate region whose brightness is around the brightness threshold by gradually changing the synthesizing ratio of images, or the like.

The number of stops by which the picture B is set underexposed with respect to the picture A depends on the area of the brightness distribution of an object. When the range of the brightness distribution is wide and the signal level of the picture B as the underexposed image is reduced below three-stop underexposure, the accumulation period for the picture B can be reduced to be shorter than that for the picture A. On the other hand, when the range of the brightness distribution is narrow and the signal level of the picture B as the underexposed image is increased above three-stop underexposure, the accumulation period of the picture B can be increased to be longer than that of the picture A.

Such an imaging method and an image process allow the HDR image to be obtained. In producing the HDR image described above, it is effective to have the matched intermediate time of accumulation periods for the picture A and the picture B even when the accumulation period for the picture B is longer than that in the case of the first embodiment and shorter than the accumulation period for the picture A. This is because, with a large difference between the image of the picture A and the image of the picture B, it would be difficult to properly synthesize images by using the picture A and the picture B.

Figure 31:
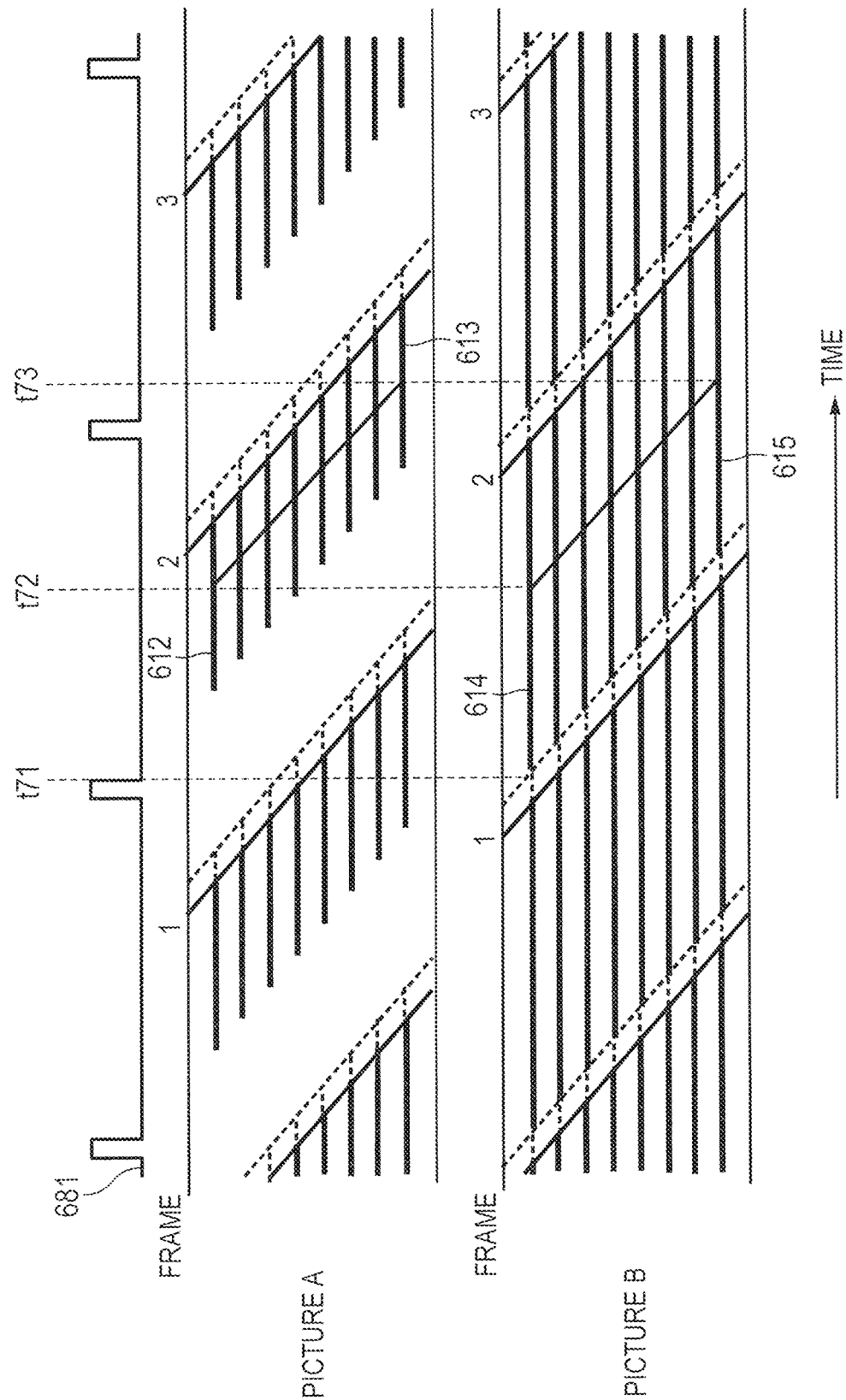
FIG. 31 is a diagram illustrating accumulation and transfer timings when an HDR capturing is performed by an imaging device according to a fourth embodiment.

FIG. 31 is a diagram illustrating accumulation and transfer timings in performing an HDR capturing by the imaging device according to the fourth embodiment. The timing sequence illustrated in FIG. 31 is different from the timing sequence of the first embodiment illustrated in FIG. 20 in that the length of an accumulation period of each line of the picture A is four times that of the first embodiment. Since other features are the same as those in FIG. 20, description thereof will be omitted.

An accumulation period 612 depicted with thick solid lines in FIG. 31 is an accumulation period of the uppermost line of a screen for the picture A, and an accumulation period 613 depicted with thick solid lines is an accumulation period of the lowermost line of the screen for the picture A. Similarly, an accumulation period 614 depicted with thick solid lines is an accumulation period of the uppermost line of a screen for the picture B, and an accumulation period 615 depicted with thick solid lines is an accumulation period of the lowermost line of the screen for the picture B.

In comparison with the first embodiment, the accumulation period of each line of the picture A is four times that of the first embodiment. Thus, in the present embodiment, the intermediate time of the accumulation period for the picture A and the intermediate time of the accumulation period for the picture B are controlled to be matched by moving forward the starting time of the accumulation period of the picture A and delaying the ending time thereof. Performing such a capturing can reduce the difference between the picture A and the picture B to produce a high quality HDR image with an increased gradation when an HDR capturing is performed by using the picture A and the picture B.

As described above, in the present embodiment, when the first image signal (picture A) is overexposed or when the second image signal (picture B) is underexposed, the first image signal and the second image signal are used to synthesize an HDR image. Thereby, when the picture A and the picture B are used to perform an HDR capturing, the difference between the picture A and the picture B can be reduced to produce a high quality HDR image.

Fifth Embodiment

An imaging device according to the fifth embodiment will be described below by using FIG. 32 and FIG. 33. In the first embodiment above, the method of obtaining two image signals having different accumulation periods by using the pixel 303 with two photodiodes having different light receiving efficiencies has been described. In contrast, in the present embodiment, a method of obtaining two image signals having different accumulation periods by using a pixel 303b with two charge holding units for a single photodiode will be described. The imaging device of the present embodiment is different from the first embodiment in the configuration of the pixel 303b. Since other configurations are substantially the same as those of the first embodiment, description thereof will be omitted.

Figure 32:
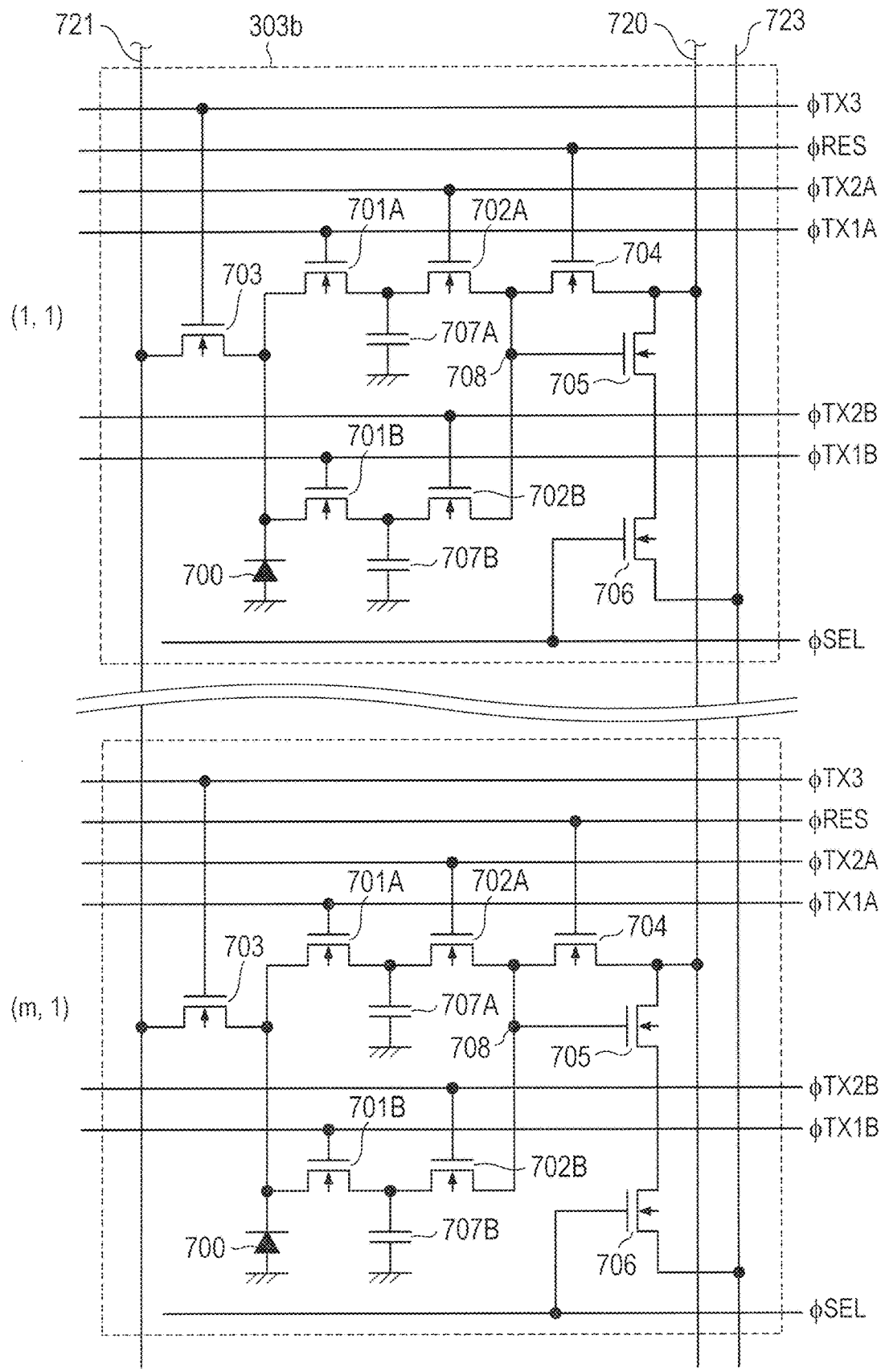
FIG. 32 is a circuit diagram illustrating an example configuration of a pixel in an imaging device according to a fifth embodiment of the present invention.

FIG. 32 is a circuit diagram illustrating an example configuration of the pixels 303b in the imaging device according to the fifth embodiment of the present invention. Each pixel 303b of the present embodiment illustrated in FIG. 32 corresponds to the pixel 303 of the first embodiment illustrated in FIG. 8. FIG. 32 illustrates, of a plurality of pixels 303b arranged in a matrix, the pixel 303b at the first row, the first column (1, 1) and the pixel 303b at the m-th row, the first column (m, 1), and illustration of other pixels 303b is omitted. The m-th row represents the lowermost row of the pixel array 302, and m is typically around several thousands. Each pixel 303b of the pixel array 302 has substantially the same configuration. Thus, the pixel 303b at the first row, the first column (1, 1) and the pixel 303b at the m-th row, the first column (m, 1) illustrated in FIG. 32 are labeled with the same reference numerals.

The pixel 303b of the present embodiment is featured in having two charge holding units 707A and 707B for a single photodiode 700. For example, since Japanese Patent Application Laid-open No. 2013-172210 discloses the configuration of a pixel having a single charge holding unit for a single photodiode 700, the detailed description of the charge holding unit will be omitted. In the following, a configuration in which the pixel 303b has two charge holding units 707A and 707B for a single photodiode 700 will be described.

The pixel 303b illustrated in FIG. 32 has at least the photodiode 700, the charge holding units 707A and 707B, a first transfer transistor 701A, a second transfer transistor 701B, and a floating diffusion region 708. The pixel 303b may further has a reset transistor 704, an amplification transistor 705, a selection transistor 706, a third transfer transistor 702A, a fourth transfer transistor 702B, an overflow transistor 703, and the like.

Although the configuration of the pixel 303b at the first row, the first column (1, 1) will be described below, this is substantially the same as the configurations of other pixels 303b on other rows and other columns. The pixel 303b is controlled by φTX1A, φTX2A, φTX1B, φTX2B, φTX3, φRES, and φSEL that are control signals output by the vertical scanning circuit 307. An image signal from the pixel 303b is output to a signal output line 723. The power source lines 720 and 721 supply a power source to each transistor.

The photodiode 700 photoelectrically converts an incident light from an object and accumulates generated signal charges. The first transfer transistor 701A is controlled by the transfer pulse φTX1A and transfers signal charges accumulated in the photodiode 700 to the charge holding unit 707A. The charge holding unit 707A holds signal charges transferred from the photodiode 700. The third transfer transistor 702A is controlled by the transfer pulse φTX2A and transfers signal charges held by the charge holding unit 707A to the floating diffusion region 708.

Similarly, the second transfer transistor 701B is controlled by the transfer pulse φTX1B and transfers signal charges accumulated in the photodiode 700 to the charge holding unit 707B. The charge holding unit 707B holds signal charges transferred from the photodiode 700. The fourth transfer transistor 702B is controlled by the transfer pulse φTX2B and transfers signal charges held by the charge holding unit 707B to the floating diffusion region 708.

The amplification transistor 705 outputs an image signal that is based on the amount of signal charges transferred to the floating diffusion region 708. The selection transistor 706 is controlled by the selection pulse φSEL and outputs, to the signal output line 723, an image signal output by the amplification transistor 705. The reset transistor 704 is controlled by the reset pulse φRES and resets signal charges transferred to the floating diffusion region 708.

With such a configuration of the pixel 303b, signal charges generated during an accumulation period for the second image signal can be transferred to and held in the charge holding unit 707B while signal charges generated during an accumulation period for the first image signal are transferred to and held in the charge holding unit 707A. That is, signal charges for two image signals having different accumulation periods can be independently held in the two charge holding units 707A and 707B.

Moreover, the pixel 303b illustrated in FIG. 32 has the overflow transistor 703. The overflow transistor 703 is controlled by the transfer pulse φTX3 to drain signal charges accumulated in the photodiode 700 via the power source line 721. Thereby, since signal charges are accumulated in the photodiode 700 during only a period when the overflow transistor 703 are in an off-state, the accumulation period of signal charges in the photodiode 700 can be controlled more flexibly.

In the following description, the first image signal based on signal charges held by the charge holding unit 707A is denoted as "picture A", and the second image signal based on signal charges held by the charge holding unit 707B is denoted as "picture B". Note that, although the picture A and the picture B are image signals obtained after a predetermined process such as correction is performed thereon in a strict sense, image signals obtained before correction or obtained during correction may also be denoted as picture A and picture B for the purpose of illustration. Further, images obtained based on the image signals picture A and picture B may also be denoted as picture A and picture B, respectively.

Next, a control method of the pixel 303b illustrated in FIG. 32 will be described. FIG. 33 is a timing chart illustrating a drive sequence of the pixel 303b in the imaging device according to the fifth embodiment of the present invention. The timing chart illustrated in FIG. 33 illustrates an example of accumulation periods, transfer periods, and readout periods of the signal charges in the pixel 303b when the first image signal (picture A) is used to produce a static image and the second image signal (picture B) is used to produce a motion image.

As used herein, an accumulation period refers to a period during which signal charges generated in the photodiode 700 are being accumulated in the photodiode 700. Further, a transfer period refers to a period during which signal charges accumulated in the photodiode 700 are being transferred to the charge holding unit 707A or the charge holding unit 707B. Further, a readout period refers to a period during which an image signal in accordance with the amount of signal charges held by the charge holding unit 707A or the charge holding unit 707B is being read out. In FIG. 33, each of these periods is denoted with a character and a number such as "A1", for example. In such a denotation, the character indicates which of the picture "A" or the picture "B" a period relates to, and the number indicates which of an accumulation period "1", a transfer period "2", or a readout period "3" the period relates to.

A vertical synchronous signal 650 and a horizontal synchronous signal 651 are output from the vertical scanning circuit 307 at a cycle Tf and a cycle Th, respectively. In FIG. 33, one frame period that is the cycle Tf of the vertical synchronous signal 650 is set at 1/60 seconds. FIG. 33 illustrates the accumulation period, the transfer period, and the readout period for each row when each of the image signals for a static image and a motion image is read out for one time each from each pixel 303b during one frame period. Note that, although m=6 is applied for the m-th row that is the lowermost row of the pixel array 302 in FIG. 33 for the illustration purposes, the actual pixel array 302 has more rows.

First, a method of capturing a static image by using the first image signal (picture A) will be described. The photodiode 700 of the pixel 303b accumulates signal charges for a static image in the accumulation period A1 illustrated in FIG. 33. The starting time and the ending time of an accumulation period A1 are controlled by using the first transfer transistor 701A and the overflow transistor 703. A length TA of the accumulation period A1 of a static image is determined based on a shutter speed set in advance by a photographer. Although the length TA of the accumulation period A1 of a static image illustrated in FIG. 33 is 1/2000 seconds, this period is depicted longer for the purpose of illustration.

Upon the completion of the accumulation period A1 for a static image, signal charges are transferred from the photodiode 700 to the charge holding unit 707A during a subsequent transfer period A2. Then, during a readout period A3, the first image signal based on signal charges held in the charge holding unit 707A is read out. In the present embodiment, since a single readout circuit is shared in the pixel 303b on the same column, readout processes during the readout period A3 are sequentially performed each with a delay of 2Th from the first row to the lowermost m-th row as illustrated in FIG. 33.

Figure 33:
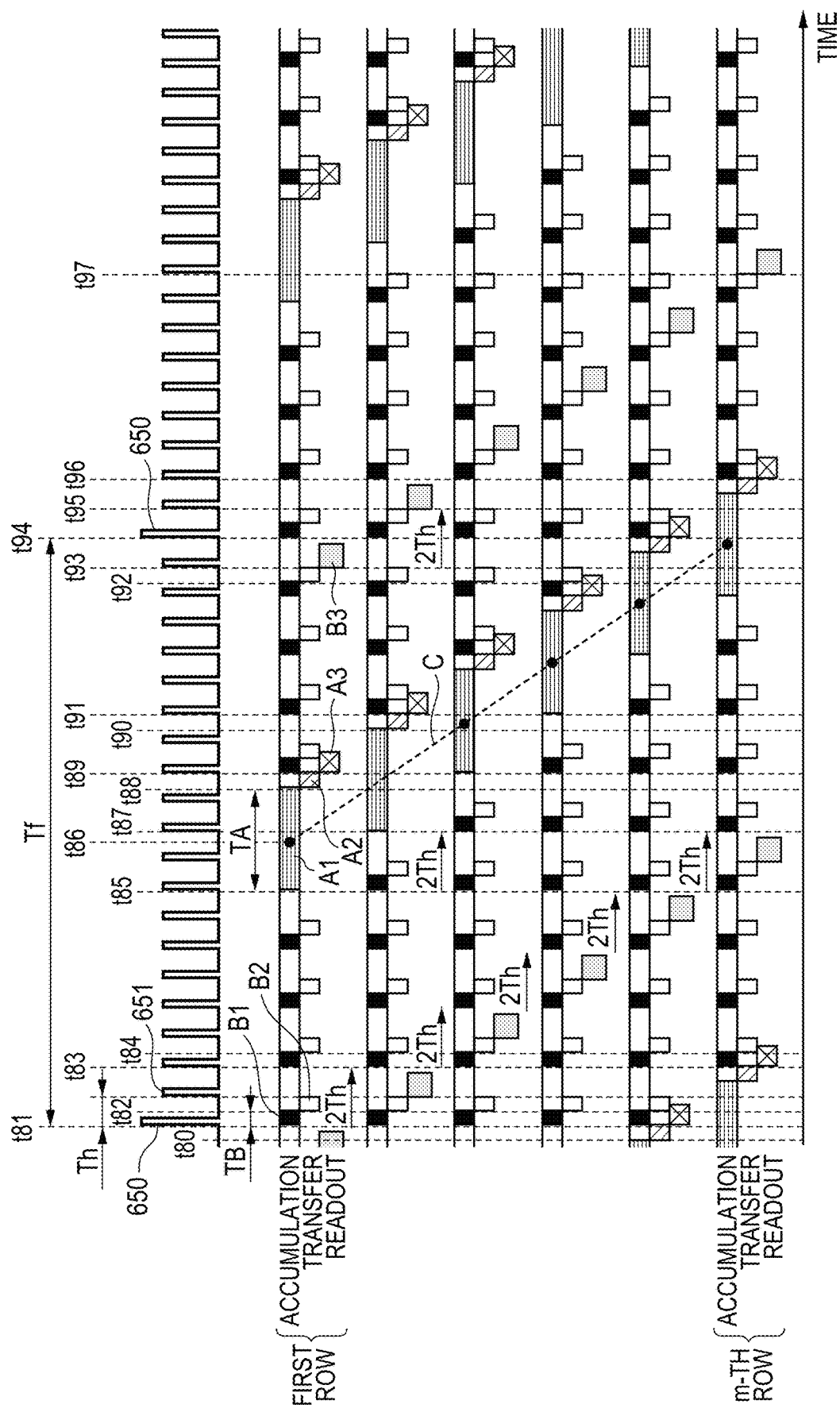
FIG. 33 is a timing chart illustrating a drive sequence of the pixel in the imaging device according to the fifth embodiment of the present invention.

The drive sequence of the pixel 303b illustrated in FIG. 33 results in a so-called rolling electronic shutter operation in which each accumulation period A1 of the first image signal for a static image is delayed by 2Th every row. However, with the accumulation periods A1 being performed at the same time for all the rows, a so-called global electronic shutter operation is possible in which the accumulation periods A1 of the first image signal for a static image are the same for all the rows.

Note that the concurrency with respect to "the same time for all the rows" in the present embodiment may be any level as long as there is no problem in an actual use. For example, with a plurality of pixels 303b being driven at completely the same time, the driver would be overloaded and, in order to reduce this load, a short time difference may be provided among a part of the pixels 303b.

Next, a method of capturing a motion image by using the second image signal (picture B) will be described. The photodiode 700 of the pixel 303b accumulates signal charges for a motion image in each of Np=8 times of accumulation periods B1 arranged substantially evenly within one frame period. Note that the number of times Np of the accumulation periods B1 during one frame period is not limited to eight and can be any natural number more than or equal to two. The starting time and the ending time of the accumulation periods B1 are controlled by using the second transfer transistor 701B and the overflow transistor 703.

With the interval (cycle) of each of Np=8 times of accumulation periods B1 being set to integral multiplication of the cycle Th of the horizontal synchronous signal 651, it becomes easier to have the matched starting time and ending time for each accumulation period B1 on each row. For example, in FIG. 33, the interval of the accumulation period B1 is 2Th that is twice the cycle Th of the horizontal synchronous signal 651. Note that the interval of the ambulation periods B1 is not limited to the above and may be uneven. Typically, the interval of the accumulation period B1 is set to a value obtained by multiplying the cycle Th of the horizontal synchronous signal 651 by a natural number that does not exceed a value m/Np, which is resulted by dividing the number of rows m of the pixel array 302 by the number of times Np.

The length TB of the accumulation period B1 for a motion image is determined based on a shutter speed set in advance by a photographer in a similar manner to the length TA of the accumulation period A1 for a static image. For example, the length 8×TB, which is the sum of the Np=8 times of accumulation periods B1 during one frame period illustrated in FIG. 33, is 1/2000 seconds that is the same as the length A1 of the accumulation period A1 for the static image. That is, the length TB of the accumulation period B1 per one time is 1/16000 seconds. For the purpose of illustration, this period is depicted longer in FIG. 33.

Upon the completion of the accumulation period B1 for a motion image, signal charges are transferred from the photodiode 700 to the charge holding unit 707B during a subsequent transfer period B2. Then, during a readout period B3, the second image signal based on signal charges held by the charge holding unit 707B is read out. In the present embodiment, since a single readout circuit is shared in the pixel 303b on the same column, readout processes during the readout period B3 are sequentially performed each with a delay of 2Th from the first row to the lowermost m-th row as illustrated in FIG. 33.

Note that, in the present embodiment, since signal charges for two image signals having different accumulation periods can be held independently in the two charge holding units 707A and 707B, an accumulation operation in the accumulation period B1 is performed in parallel to a readout operation in the readout period A3. Further, in the present embodiment, since Np times of accumulation periods B1 for acquiring the second image signal for a motion image are arranged dispersed within one frame period, the shutter speed can be artificially delayed by dispersing exposure periods within one frame period. This allows for capturing a smooth motion image with suppressed so-called jerkiness.

The drive sequence illustrated in FIG. 33 is of a rolling electronic shutter operation, because the timings of the transfer periods B2 immediately before the readout periods B3 are different among respective rows though the starting time and ending time of respective accumulation periods B1 of the first image signal for a motion image are the same for all the rows. However, with the timing of the transfer periods B2 immediately before the readout periods B3 being performed at the same time for all the rows, a capturing of a motion image can be the global electronic shutter operation in a similar manner to the case of a static image.

The drive sequence of the pixel 303b of the present embodiment illustrated in FIG. 32 will be again described in further details with reference to FIG. 32 and FIG. 33. First, a drive sequence of the pixel 303b in acquiring the second image signal (picture B) for a motion image will be described.

At time t80, in response to the transfer pulse φTX2B on the first row and the transfer pulses φTX2A on all the rows being turned to a high level, the fourth transfer transistor 702B on the first row and the third transfer transistors 702A on all the rows are turned on. At this time, the reset pulses φRES on all the rows have already been high level and the reset transistors 704 have been turned on. This causes a reset of signal charges held in the floating diffusion regions 708 on all the rows, the charge holding unit 707B for a motion image on the first row, and charge holding unit 707A for a static image on all the rows. Note that the selection pulse φSEL on the first row at this time is low level.

At time t81, in response to the transfer pulses φTX3 on all the rows being turned to a low level, the overflow transistors 703 on all the rows are turned off. This allows the photodiodes 700 on all the rows to accumulate signal charges, and signal charges for a motion image are accumulated in the photodiodes 700 on all the rows during the accumulation period B1.

At time t82, in response to the transfer pulses φTX1B on the first row being turned to a high level, the second transfer transistor 701B on the first row is turned on. Thereby, signal charges accumulated in the photodiode 700 on the first row are transferred to the charge holding unit 707B on the first row during the transfer period B2. Then, in response to the transfer pulse φTX1B on the first row being turned to a low level, the second transfer transistor 701B on the first row is turned off.

At time t83, the second accumulation of signal charges for a motion image is performed by the photodiode 700 in a similar manner to the time t81. Further, at time t84, the second transfer of signal charges for a motion image is performed from the photodiode 700 to the charge holding unit 707B in a similar manner to the time t82. These signal charges by the second accumulation and transfer are added to the signal charges transferred to and held in the charge holding unit 707B at the previous time t82. Subsequently, in a similar manner, the third to the eighth accumulation and transfer of a charges signal is repeated intermittently and added to the signal charges previously transferred to the charge holding unit 707B and held.

Also on the second and subsequent rows, in a similar manner to the first row, accumulation and transfer of signal charges for a motion image are sequentially performed each delayed by the period 2Th. In FIG. 33, the length of each one accumulation period B1 (for example, from the time t81 to the time t82) of signal charges for a motion image is all set to the same length TB. Further, each interval from the starting time of an accumulation period to the starting time of the next accumulation period for a motion image (for example, from the time t81 to the time t83) is set to the same length 2Th.

At time t92, upon the completion of the eight times of transfer of signal charges to the charge holding unit 707B on the first row, the reset pulse φRES on the first row is turned to a low level and thus the reset transistor 704 on the first row is turned off. Thereby, a reset state of the floating diffusion region 708 is unlatched. At the same time, in response to the selection pulse φSEL on the first row being turned to a high level, the selection transistor 706 on the first row is turned on. This allows for readout of an image signal on the first row. Then, in response to the transfer pulse φTX2B on the first row being turned to a high level, the fourth transfer transistor 702B on the first row is turned on. Thereby, signal charges for a motion image generated in the photodiode 700 during each of the first to the eighth accumulation periods B1 are transferred from the charge holding unit 707B to the floating diffusion region 708.

During the readout period B3 from time t93, an output in accordance with the potential of the floating diffusion region 708 is read out to the signal output line 723 via the amplification transistor 705 and the selection transistor 706, and then supplied to the readout circuit (not depicted) and output to the outside as an image signal for a motion image on the first row. Also in subsequent frames on and after time t94, the same operations as those in the previous frame performed from the time t80 are repeated to acquire an image signal for a motion image on the first row.

On the other hand, at time t95 that is another period 2Th after the time t93 at which the readout period B3 on the first row is started, the readout period B3 from the floating diffusion region 708 on the second row is started in a similar manner to the first row. Also on the third and subsequent rows, the same operations are sequentially performed each with a delay of the period 2Th and, when image signals up to the m-th, lowermost row are obtained during the readout period B3 from time t97, image signals corresponding to one frame for a motion image can be obtained.

FIG. 33 depicts time t86 that is the intermediate time of eight accumulation periods B1 in total (the time t81 to the time t92) for acquiring an image signal on the first row for a motion image. Further, a line that connects intermediate times of the first and subsequent accumulation periods is indicated as a dotted line C. Since the first accumulation periods of the eight accumulation periods B1 in total on respective rows are sequentially started each with a delay of the period 2Th, the intermediate times of eight accumulation periods B1 in total on respective rows are also each delayed by the period 2Th in a similar manner.

Next, a drive sequence of the pixel 303b in acquiring a first image signal (picture A) for a static image will be described.

At time t85, in response to the transfer pulses φTX3 on all the rows being turned to a low level, the overflow transistor 703 on the first row is turned off. This allows the photodiode 700 on the first row to accumulate signal charges, and signal charges for a static image are accumulated in the photodiode 700 on the first row during the accumulation period A1.

At time t88, in response to the reset pulse φRES on the first row being turned to a low level, the reset transistor 704 on the first row is turned off. Thereby, a reset state of the floating diffusion region 708 is unlatched. At the same time, in response to the selection pulse φSEL on the first row being turned to a high level, the selection transistor 706 on the first row is turned on. This allows for readout of an image signal on the first row. Furthermore, in response to the transfer pulse φTX1A on the first row being turned to a high level, the first transfer transistor 701A on the first row is turned on. Thereby, signal charges for a static image accumulated in the photodiode 700 on the first row are transferred to the charge holding unit 707A on the first row during the transfer period A2.

At time t89, in response to the transfer pulse φTX1A on the first row being turned to a low level, the first transfer transistor 701A on the first row is turned off. Thereby, transfer of signal charges from the photodiode 700 to the charge holding unit 707A on the first row ends. Subsequently, in response to the transfer pulse φTX2A on the first row being turned to a high level, the third transfer transistor 702A on the first row is turned on. Thereby, signal charges for a static image accumulated in the charge holding unit 707A on the first row are transferred to the floating diffusion region 708. Then, during the readout period A3, an output in accordance with the potential of the floating diffusion region 708 is read out by the readout circuit (not depicted) via the amplification transistor 705, the selection transistor 706, and the signal output line 723 on the first row. The readout circuit (not depicted) outputs the read out signal to the outside as an image signal for a static image on the first row.

Next, at time t87 that is another period 2Th after the time t85 at which the accumulation period A1 starts on the first row, the accumulation period A1 on the second row is started in the same manner as the accumulation period A1 on the first row. That is, the overflow transistor 703 on the second row is turned off, the photodiode 700 on the second row is able to accumulate signal charges, and accumulation of signal charges for a static image is started in the photodiode 700 on the second row.

At time t90, signal charges for a static image accumulated in the photodiode 700 on the second row are transferred to the charge holding unit 707A. Subsequently, at time t91, upon the completion of the transfer of signal charges to the charge holding unit 707A, signal charges are transferred from the charge holding unit 707A on the second row to the floating diffusion region 708. Then, an output in accordance with the potential of the floating diffusion region 708 is read out by the readout circuit (not depicted) via the amplification transistor 705, the selection transistor 706, and the signal output line 723 on the second row. The readout circuit (not depicted) outputs the read out signal to the outside as an image signal for a static image on the second row.

Afterwards, on and after the third rows, the same operations are sequentially performed each with a delay of the period 2Th and, when image signals up to the m-th, lowermost row have been obtained during the readout period A3 from time t96, image signals for one frame for a motion image are obtained. Note that accumulation operation and transfer operation of a charge signal for a motion image are suspended during the accumulation period A1 for a static image and resumed after the completion of the accumulation period A1 for the static image.

In such a way, in the drive sequence of the pixel 303b of the present embodiment, Np accumulation periods B1 for a motion image are arranged dispersed within one frame period. Then, the half number Np/2 of accumulation periods B1 are arranged before the intermediate time t86 of the accumulation period A1 for a static image, and the half number Np/2 of accumulation periods B1 are arranged after the intermediate time t86. As a result, the intermediate time of the Np accumulation periods B1 for a motion image during one frame period matches the intermediate time of the accumulation period A1 for a static image during one frame period on each row. The change of the intermediate time on each row is indicated with the dotted line C in FIG. 33. The intermediate time of the accumulation period of the first image signal for a static image and the intermediate time of the accumulation period of the second image signal for a motion image are controlled by the vertical scanning circuit 307.

Note that, although the number of times Np of the accumulation periods B1 for a frame of a motion image is eight and the number of times of the accumulation periods A1 for a frame of a static image is one in the above description, these numbers are not limited to the above. The number of times of accumulation periods of an image signal for a frame of a motion image and a static image may be set in accordance with capturing conditions or the like. Further, although a static image is produced based on signal charges held in the first charge holding unit and a motion image is produced based on signal charges held in the second charge holding unit in the above description, they may be produced vise versa, or the first charge holding unit and the second charge holding unit may be switched on a frame period basis.

As described above, the imaging device of the present embodiment has a readout unit (readout circuit) that reads out the first image signal based on signal charges held in the first charge holding unit and the second image signal based on signal charges held in the second charge holding unit. Thereby, in a similar manner to the first embodiment, two image signals whose accumulation periods are different can be obtained at the same time.

Further, in the imaging device of the present embodiment, the number of times of transferring signal charges from the third photoelectric conversion unit (photodiode) to the second charge holding unit during one frame period is greater than the number of times of transferring signal charges from the third photoelectric conversion unit to the first charge holding unit during one frame period. Thus, since the accumulation periods of the second image signal are arranged more dispersed during one frame period, a smooth motion image with suppressed jerkiness can be obtained by using the second image signal.

Further, a scanning unit (vertical scanning circuit) that drives a pixel such that the intermediate time of the accumulation period of the first image signal matches the intermediate time of the accumulation period of the second image signal and a generating unit (system control CPU) that generates an image by using the first image signal and the second image signal are provided. In a similar manner to the first embodiment, this allows for high quality reproduction of images generated by using two image signals having different lengths of accumulation periods output from a single imaging element.

Further, the configuration of the present embodiment can be combined with the configuration of the embodiments described above. For example, in a similar manner to the second embodiment, the pixel may be driven such that the intermediate time of one of a plurality of accumulation periods of the first image signal included in the accumulation period of the second image signal matches the intermediate time of the accumulation period of the second image signal. Therefore, the same advantages as those in the first embodiment can be obtained and, since the framerate can be independently set for the picture A and the picture B, slow reproduction at a high framerate can be performed by using the picture A, for example.

Further, in a similar manner to the third embodiment, the first image signal and the second image signal may be read out at different timings by using the same readout circuit. Therefore, the same advantages as those in the first embodiment can be obtained and the readout circuit can be shared for the picture A and the picture B. That is, only one readout circuit is provided to a pair of pixels of corresponding picture A and picture B, which allows for a reduction in the circuit size of the readout circuit and therefore a reduction in the size of imaging device.

Further, in a similar manner to the fourth embodiment, when the first image signal (picture A) is overexposed or when the second image signal (picture B) is underexposed, the first image signal and the second image signal may be used to synthesize an HDR image. Thereby, when the picture A and the picture B are used to perform an HDR capturing, the difference between the picture A and the picture B can be reduced to produce a high quality HDR image.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-031073, filed Feb. 22, 2016 and Japanese Patent Application No. 2017-000524, filed Jan. 5, 2017 which are hereby incorporated by reference herein in their entirety.

What is claimed is:

1. An imaging device comprising:
a pixel array including having a pixel including a photoelectric converter, a first capacitor, and a second capacitor, wherein the first and second capacitor hold signal charges generated in the photoelectric converter;
an A/D converter that converts out a first image signal that is based on signal charges which are generated in the photoelectric converter during a first accumulation period and held in the first capacitor and a second image signal that is based on signal charges which are generated in the photoelectric converter during a second accumulation periods and held in the second capacitor; and
a scanner that drives the pixel such that the first accumulation period includes the second accumulation periods;
wherein the pixel further includes
a first transfer transistor that transfers signal charges from the photoelectric converter to the first capacitor;
a second transfer transistor that transfers signal charges from the photoelectric converter to the second capacitor; and
an overflow transistor that drains signal charges accumulated in the photoelectric converter, and
wherein the scanner controls the first transfer transistor, the second transfer transistor, and the overflow transistor to drive the pixel such that the first accumulation period includes the second accumulation periods.

2. The imaging device according to claim 1, further comprising an image generator that generates images by using the first image signal and the second image signal.

3. The imaging device according to claim 2, wherein, when the first image signal is overexposed or the second image signal is underexposed, the image generator synthesizes an HDR image by using the first image signal and the second image signal.

4. The imaging device according to claim 2, wherein, when a noise occurs in one of the first image signal and the second image signal, the image generator corrects one of the first and second image signals which has the noise by using the other which does not have the noise.

5. The imaging device according to claim 2,
wherein the image generator generates a first image from the first image signal, generates a second image from the second image signal, and associates the first image and the second image with each other to produce a video, and
wherein the imaging device further comprises:
a recording unit that records the video; and
a reproducing unit that reproduces the video.

6. The imaging device according to claim 5, wherein, when reproduction of the second image as the video is paused, the reproducing unit displays the first image associated with the second image.

7. The imaging device according to claim 6, wherein, when a noise occurs in one of the first image and the second image associated with each other, the reproducing unit replaces one of the first and second images which has the noise with the other which does not have the noise, and displays the replaced image.

8. An imaging device comprising:
a pixel array including having a pixel including a photoelectric converter, a first capacitor, and a second capacitor, wherein the first and second capacitor hold signal charges generated in the photoelectric converter;
an A/D converter that converts out a first image signal that is based on signal charges which are generated in the photoelectric converter during a first accumulation period and held in the first capacitor and a second image signal that is based on signal charges which are generated in the photoelectric converter during a second accumulation periods and held in the second capacitor; and
a scanner that drives the pixel such that the first accumulation period includes the second accumulation periods;
wherein the A/D converter converts the first image signal and the second image signal at different timings by using a same readout circuit.

9. The imaging device according to claim 8, further comprising an image generator that generates images by using the first image signal and the second image signal.

10. The imaging device according to claim 9, wherein, when the first image signal is overexposed or the second image signal is underexposed, the image generator synthesizes an HDR image by using the first image signal and the second image signal.

11. The imaging device according to claim 9, wherein, when a noise occurs in one of the first image signal and the second image signal, the image generator corrects one of the first and second image signals which has the noise by using the other which does not have the noise.

12. The imaging device according to claim 9,
wherein the image generator generates a first image from the first image signal, generates a second image from the second image signal, and associates the first image and the second image with each other to produce a video, and
wherein the imaging device further comprises:
a recording unit that records the video; and
a reproducing unit that reproduces the video.

13. The imaging device according to claim 12, wherein, when reproduction of the second image as the video is paused, the reproducing unit displays the first image associated with the second image.

14. The imaging device according to claim 13, wherein, when a noise occurs in one of the first image and the second image associated with each other, the reproducing unit replaces one of the first and second images which has the noise with the other which does not have the noise, and displays the replaced image.

* * * * *